United States Patent [19]

Bergman et al.

[11] 4,106,729
[45] Aug. 15, 1978

[54] ESCAPE SLIDE DEPLOYING APPARATUS FOR USE IN AN AIRPLANE

[75] Inventors: Burton Bergman, Kent; Stewart M. Herman, Seattle, both of Wash.

[73] Assignees: The Boeing Company, Seattle, Wash.; Aeritalia S.p.A., Napoli, Italy

[21] Appl. No.: 755,838

[22] Filed: Dec. 30, 1976

[51] Int. Cl.² .............................................. B64D 25/14
[52] U.S. Cl. .................................. 244/137 P; 74/520; 193/25 B; 244/DIG. 2
[58] Field of Search .......... 244/137 P, DIG. 2, 129.6, 244/129.5; 193/25 B; 182/48; 24/230 AT; 74/520 X

[56] References Cited

U.S. PATENT DOCUMENTS

| 2,531,263 | 11/1950 | Fink et al. ........................... 244/129.6 |
| 2,751,636 | 6/1956 | Heinemann et al. .......... 244/129.5 X |
| 2,765,131 | 10/1956 | Boyle ................................. 244/137 P |
| 3,435,492 | 4/1969 | Banas ............................... 244/137 P X |
| 3,465,991 | 9/1969 | Banas et al. ...................... 244/137 P |
| 3,598,215 | 8/1971 | Summer et al. ................... 193/25 B |
| 3,633,853 | 1/1972 | Collins .............................. 244/137 P |
| 3,634,914 | 1/1972 | Schroedter ................... 244/137 P X |
| 3,771,749 | 11/1973 | Smialowicz ....................... 244/137 P |
| 3,802,125 | 4/1974 | Baker ..................................... 49/360 |
| 3,833,088 | 9/1974 | Chacko et al. ........................ 182/48 |
| 3,852,854 | 12/1974 | Sigrud et al. ................... 24/230 AT |

Primary Examiner—Barry L. Kelmachter
Attorney, Agent, or Firm—Christensen, O'Connor, Johnson & Kindness

[57] ABSTRACT

An escape slide container is mounted for selective, upward movement with a track-mounted, overhead sliding door in an aircraft fuselage. Slide deployment mechanism for releasing the container from the door and for attaching it to the floor of the aircraft allows the door to move upwardly independently of the container, leaving the container attached to the floor. An over-center linkage supports the container above the floor while upward movement of the door trips the over-center linkage to propel the container outwardly through the door opening to deploy the escape slide under the urging of gravity.

17 Claims, 31 Drawing Figures

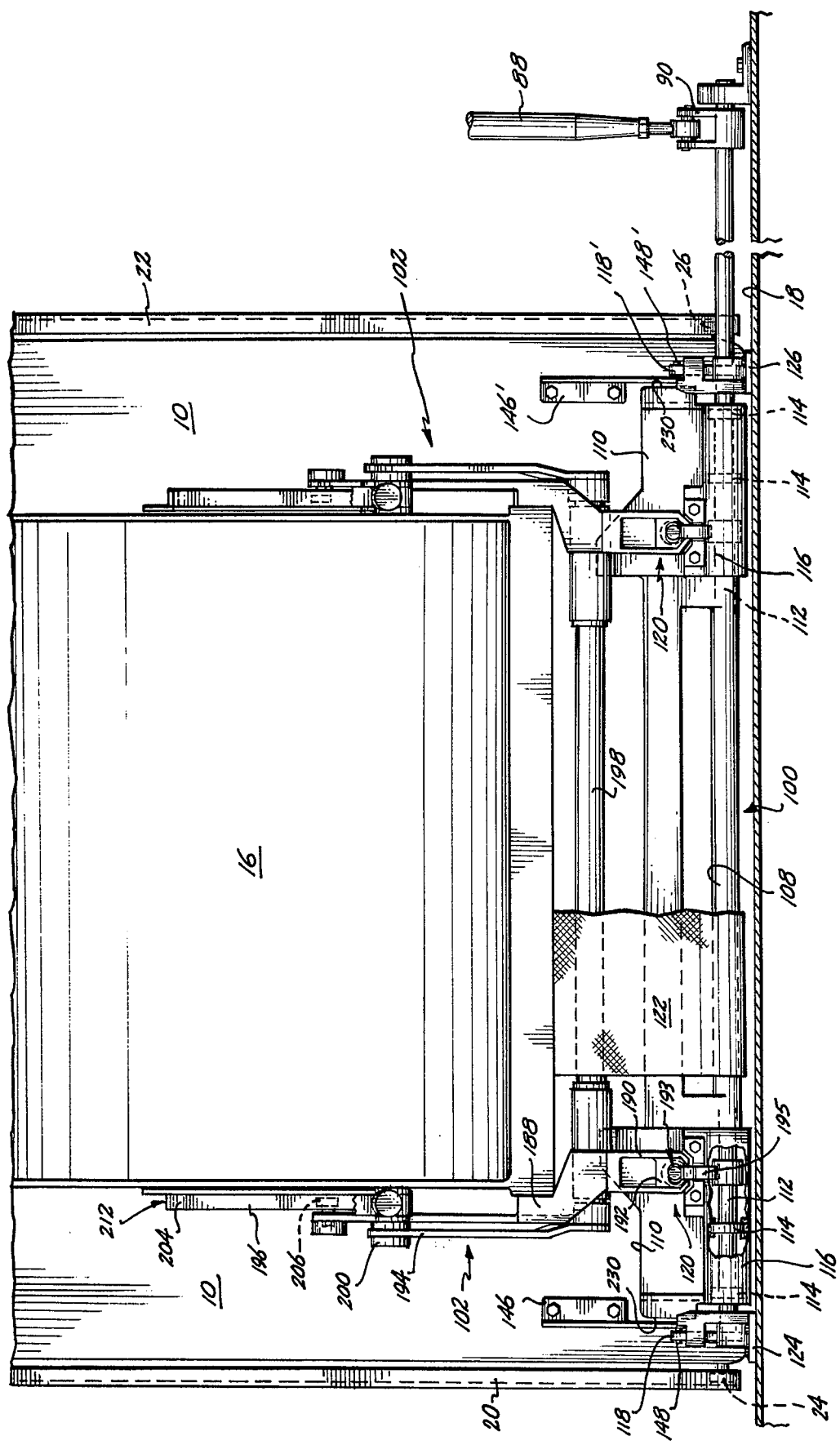

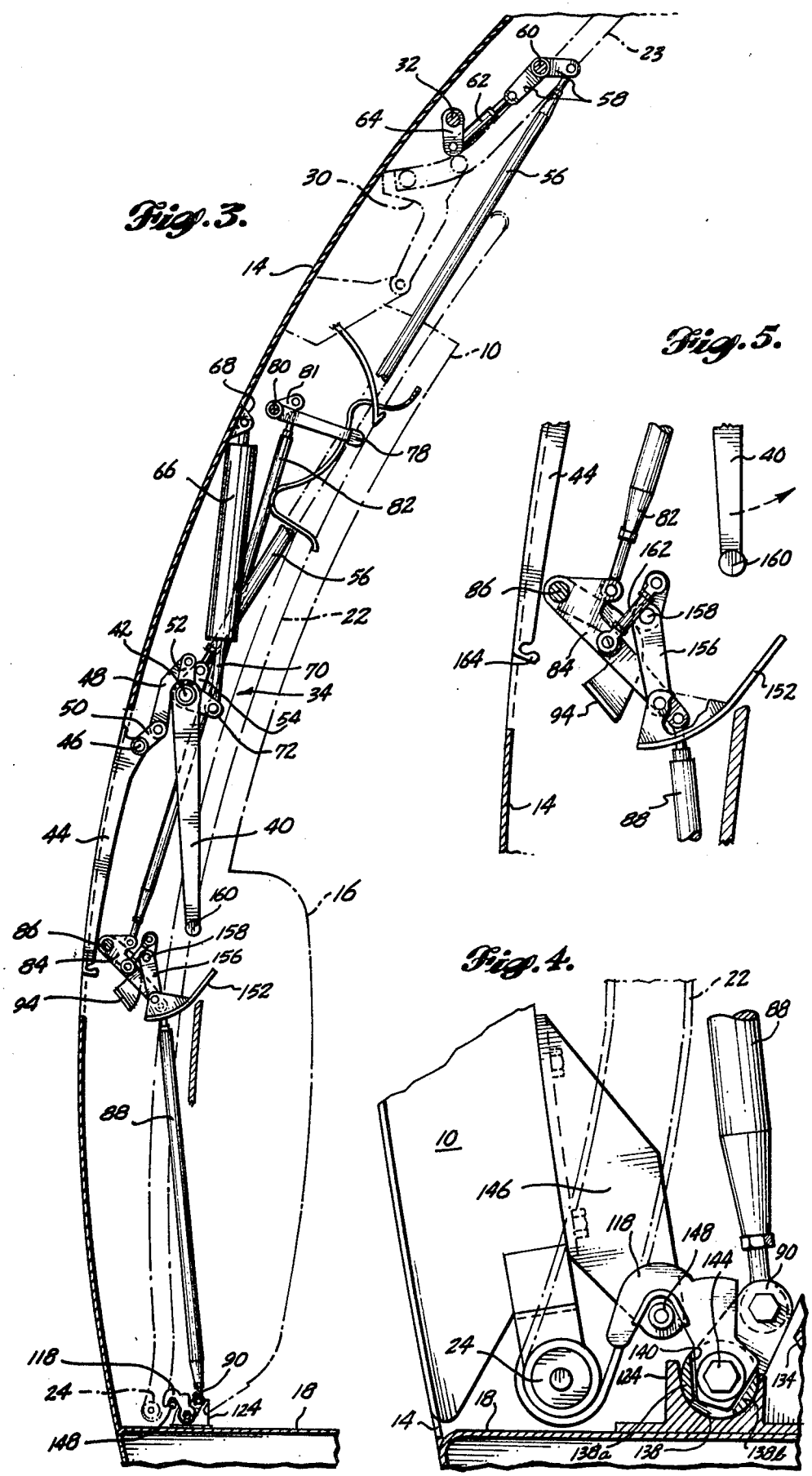

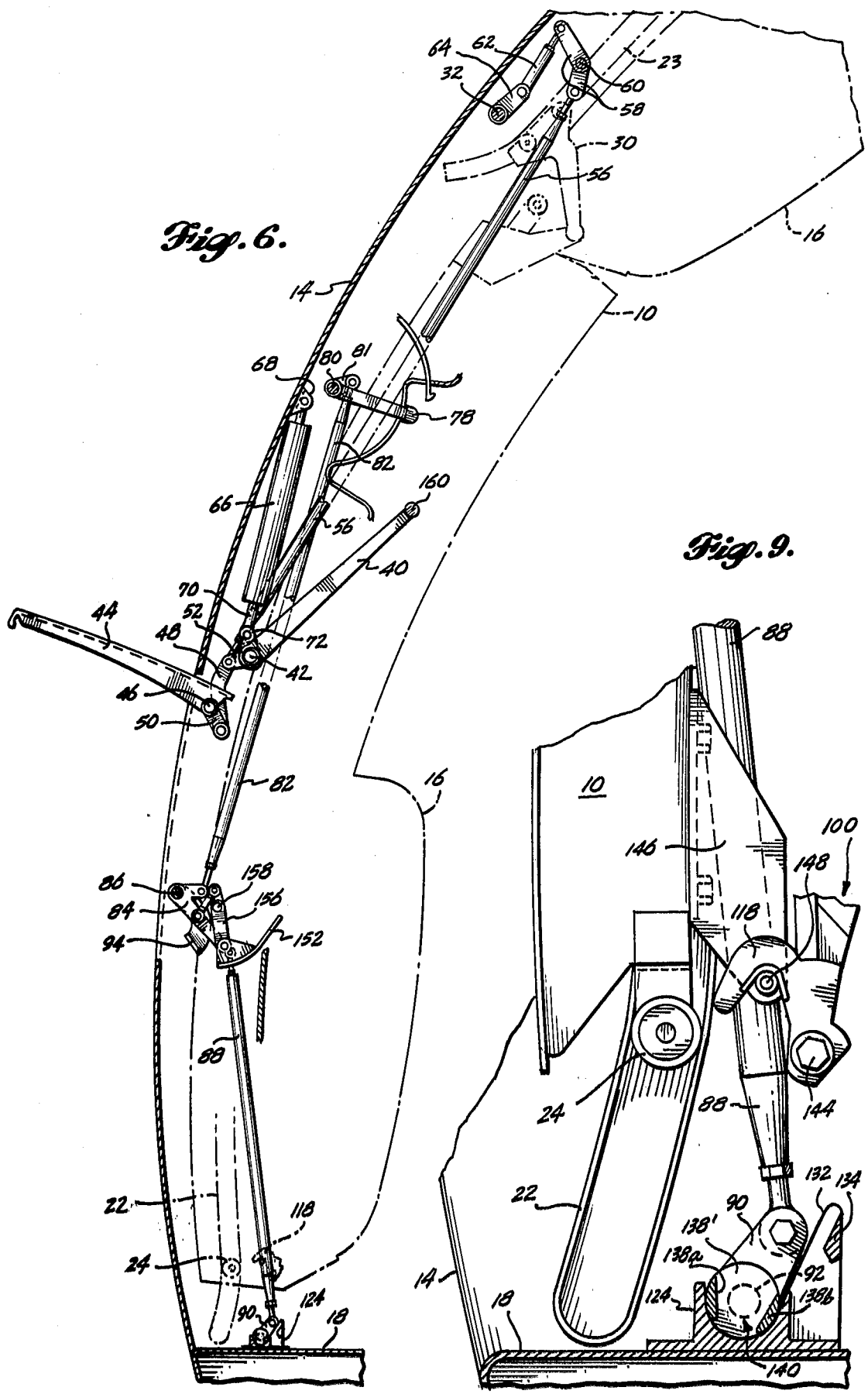

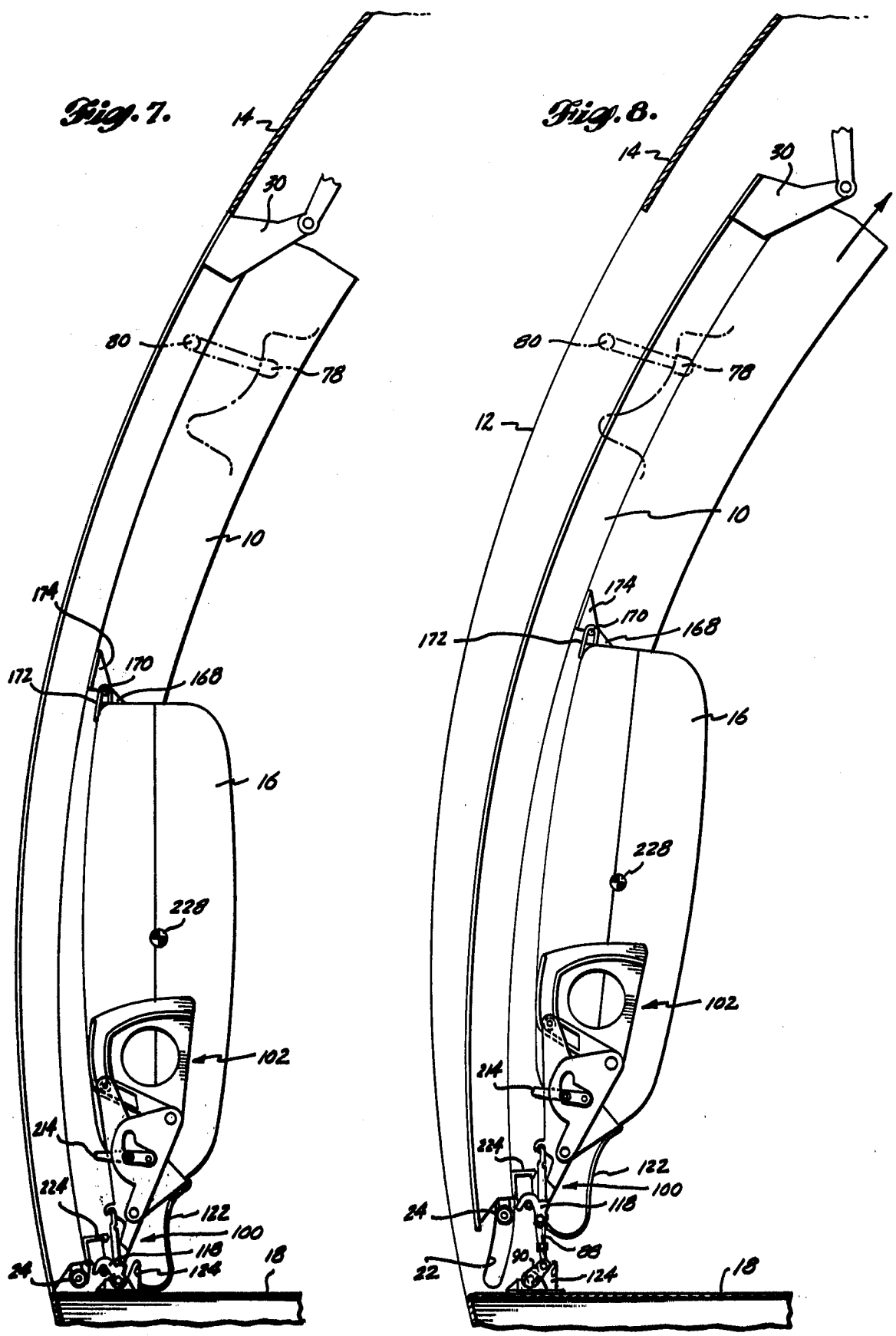

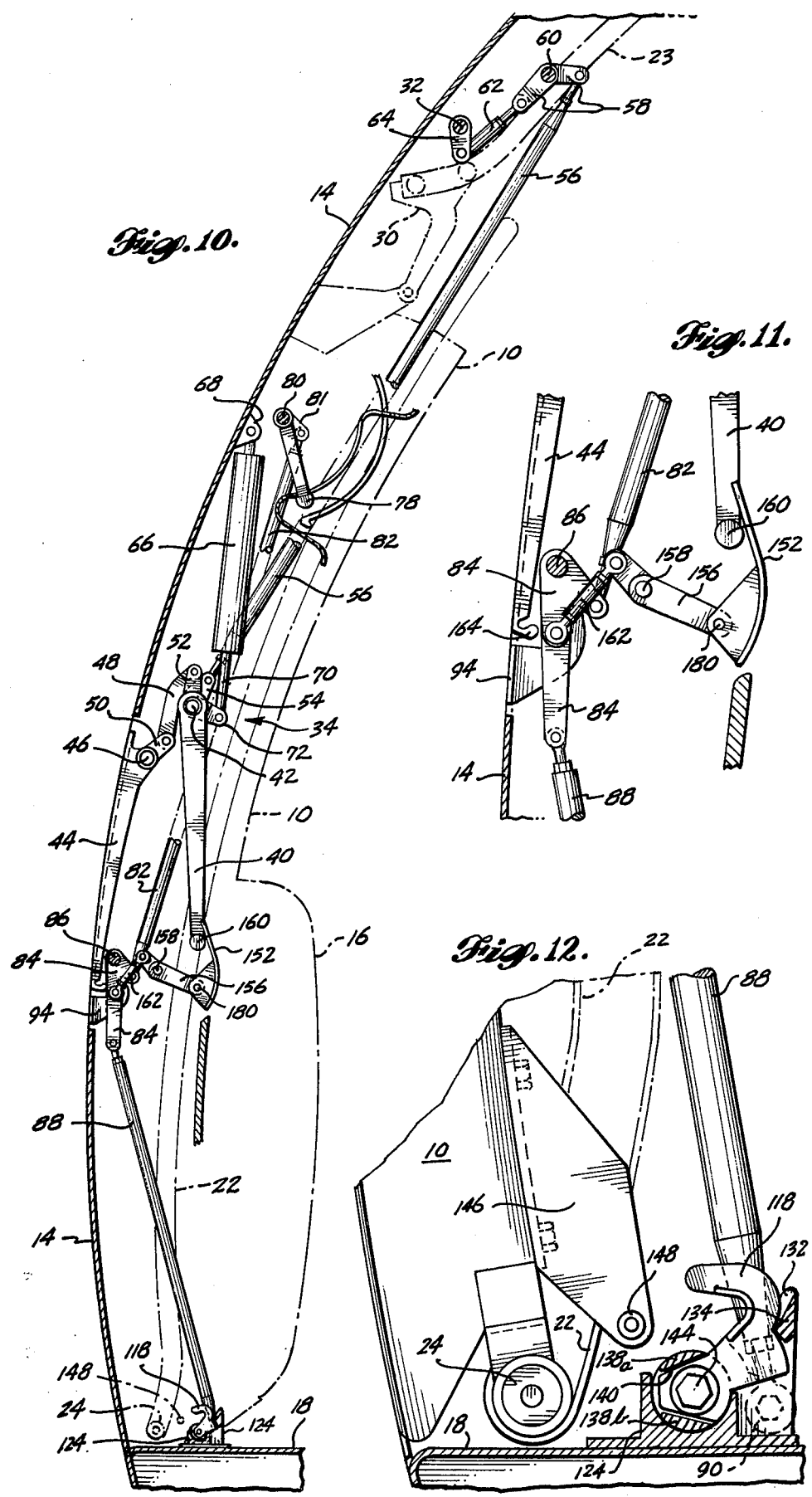

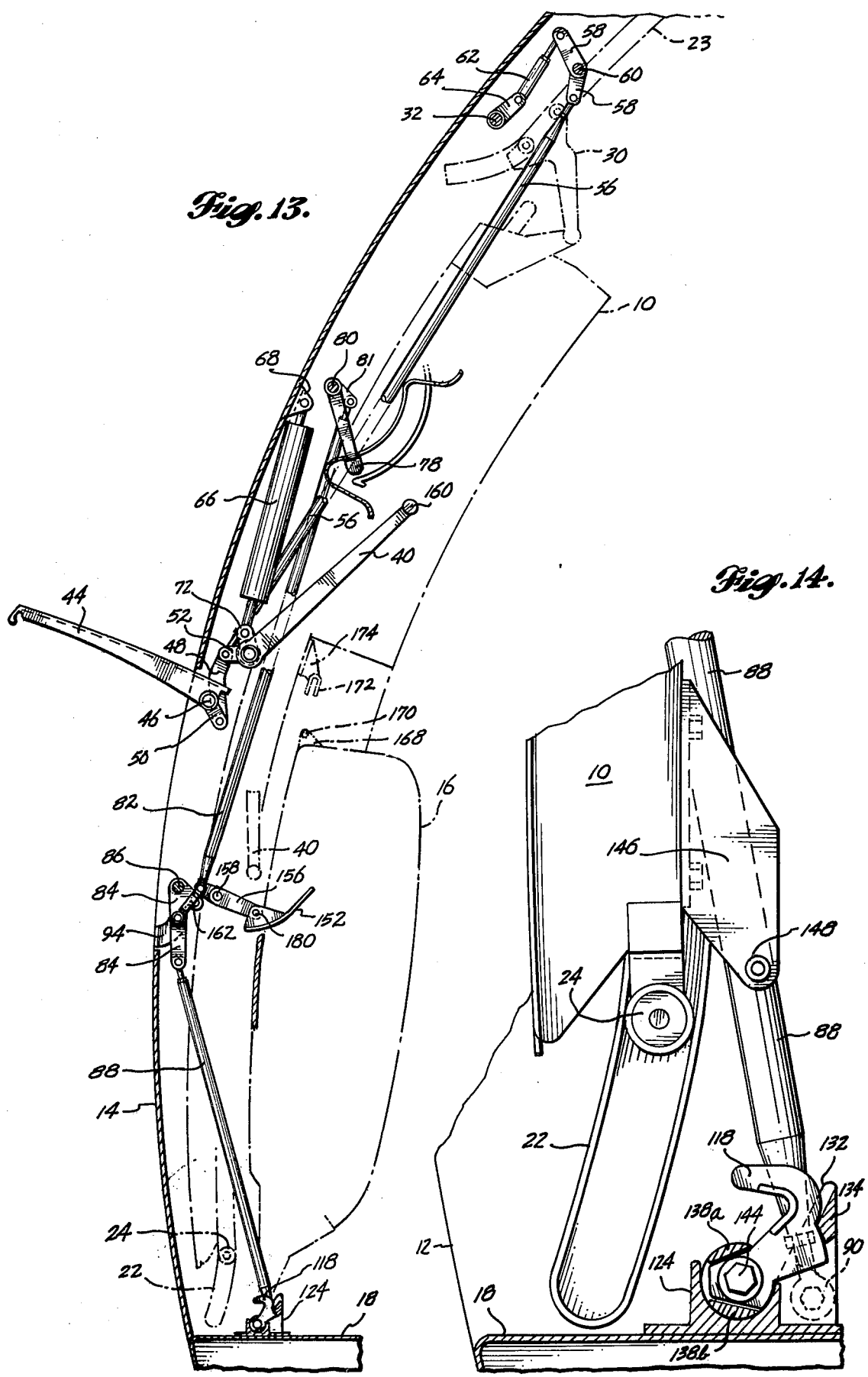

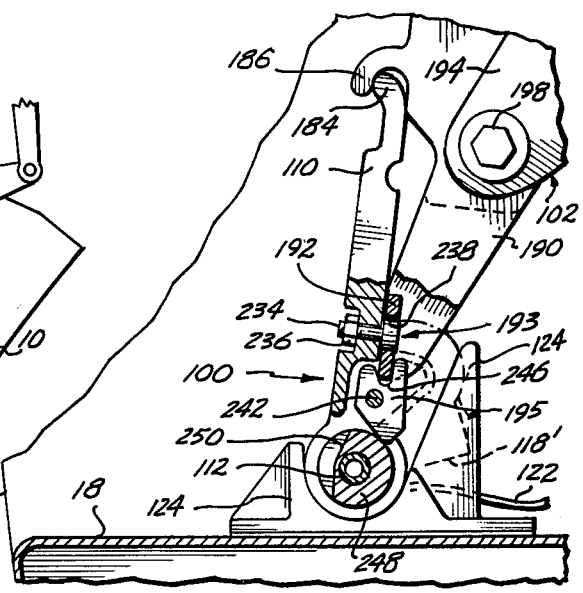
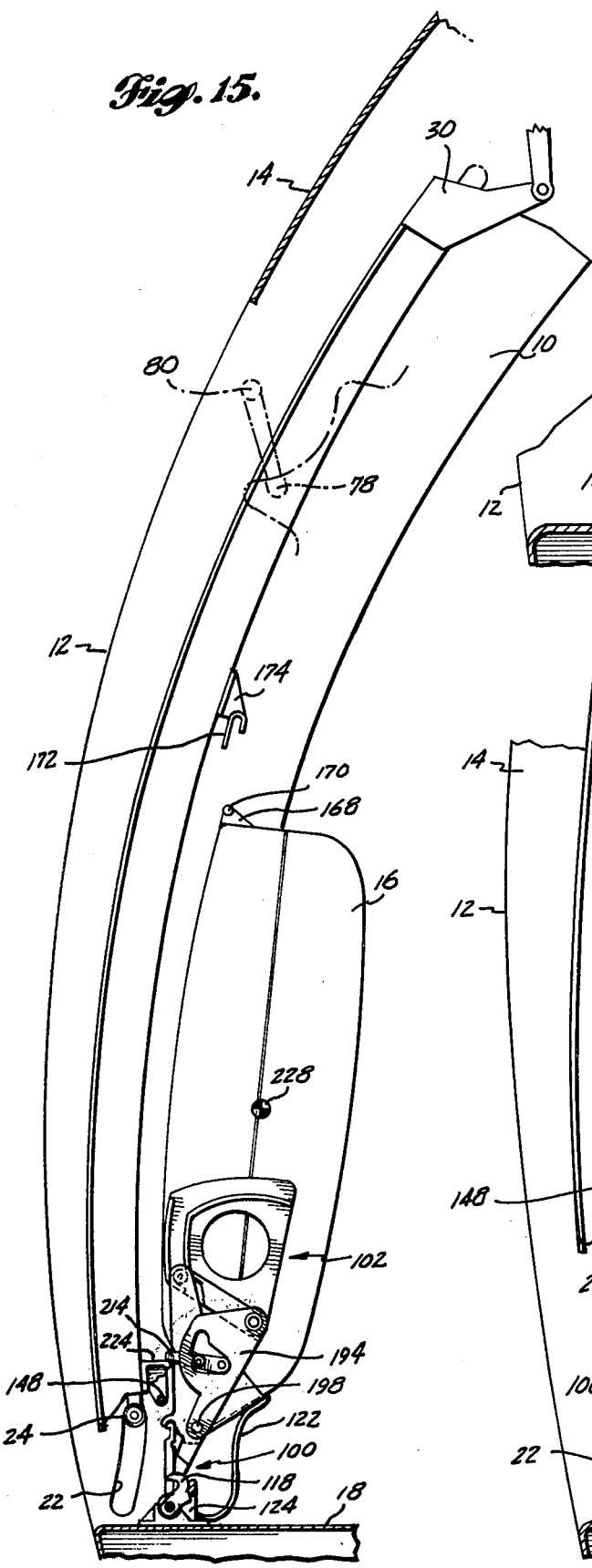
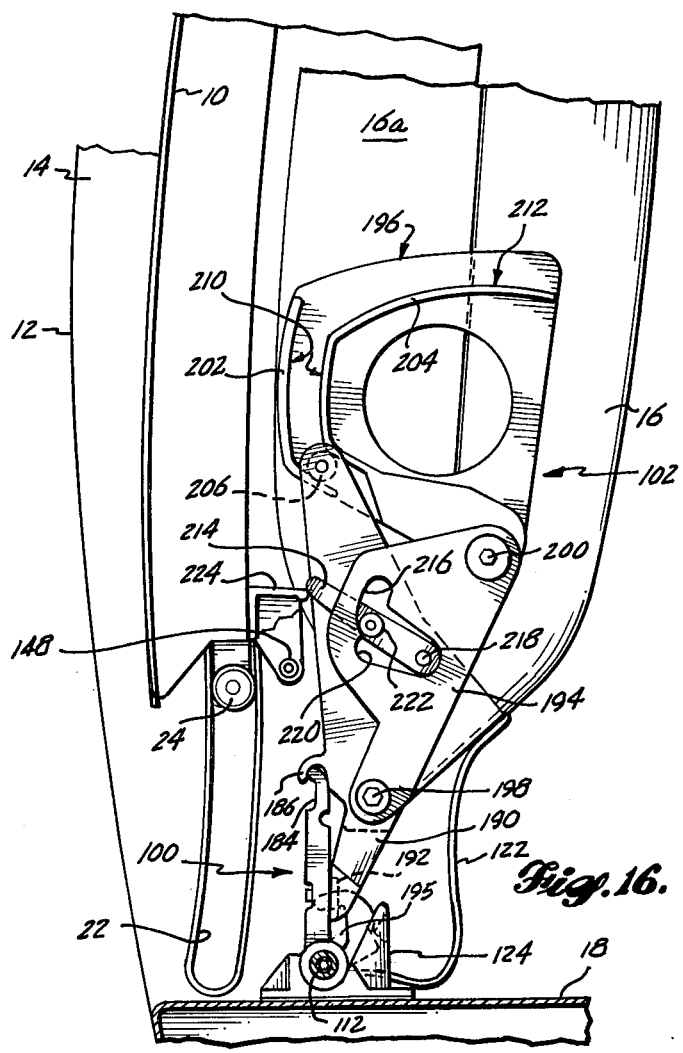

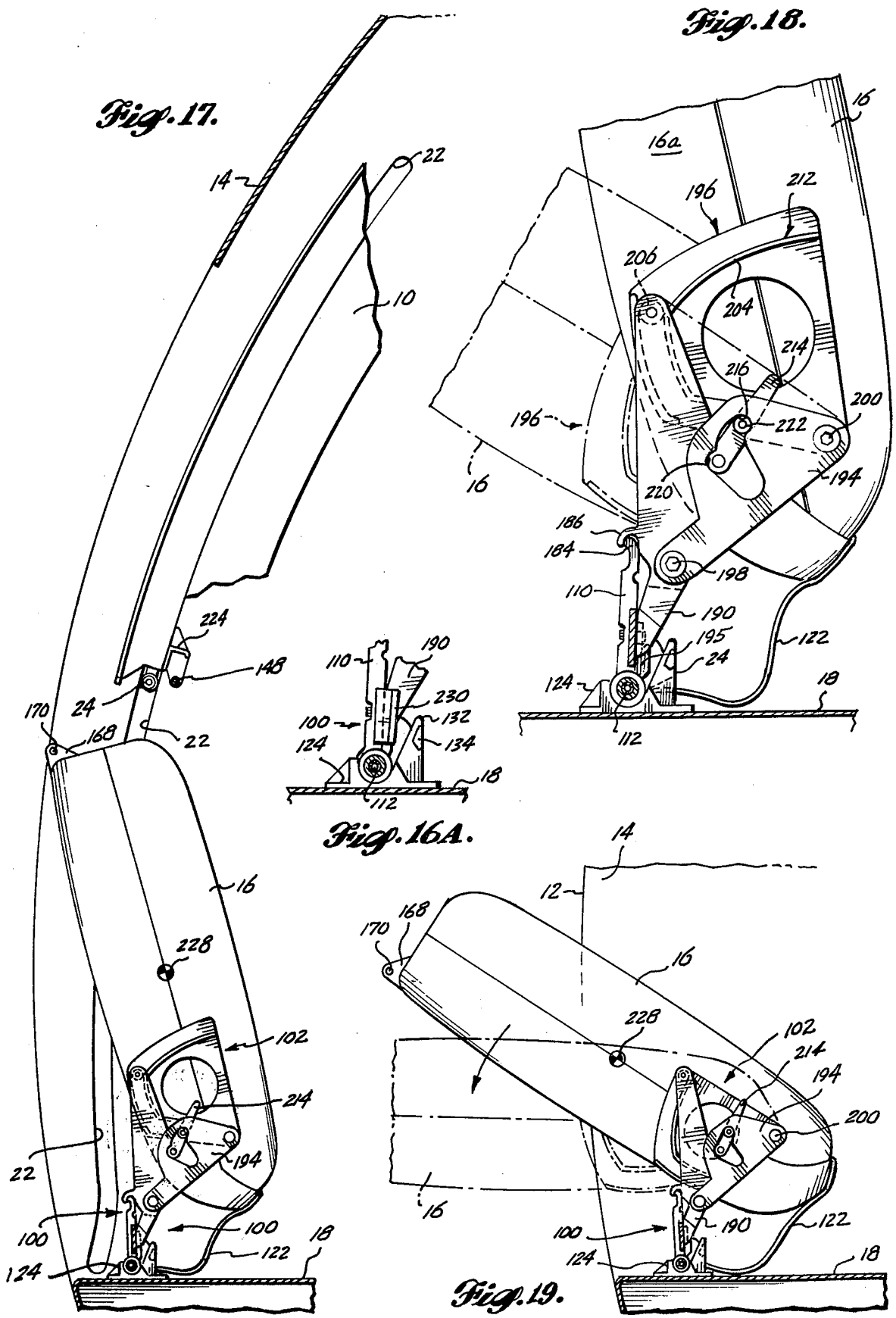

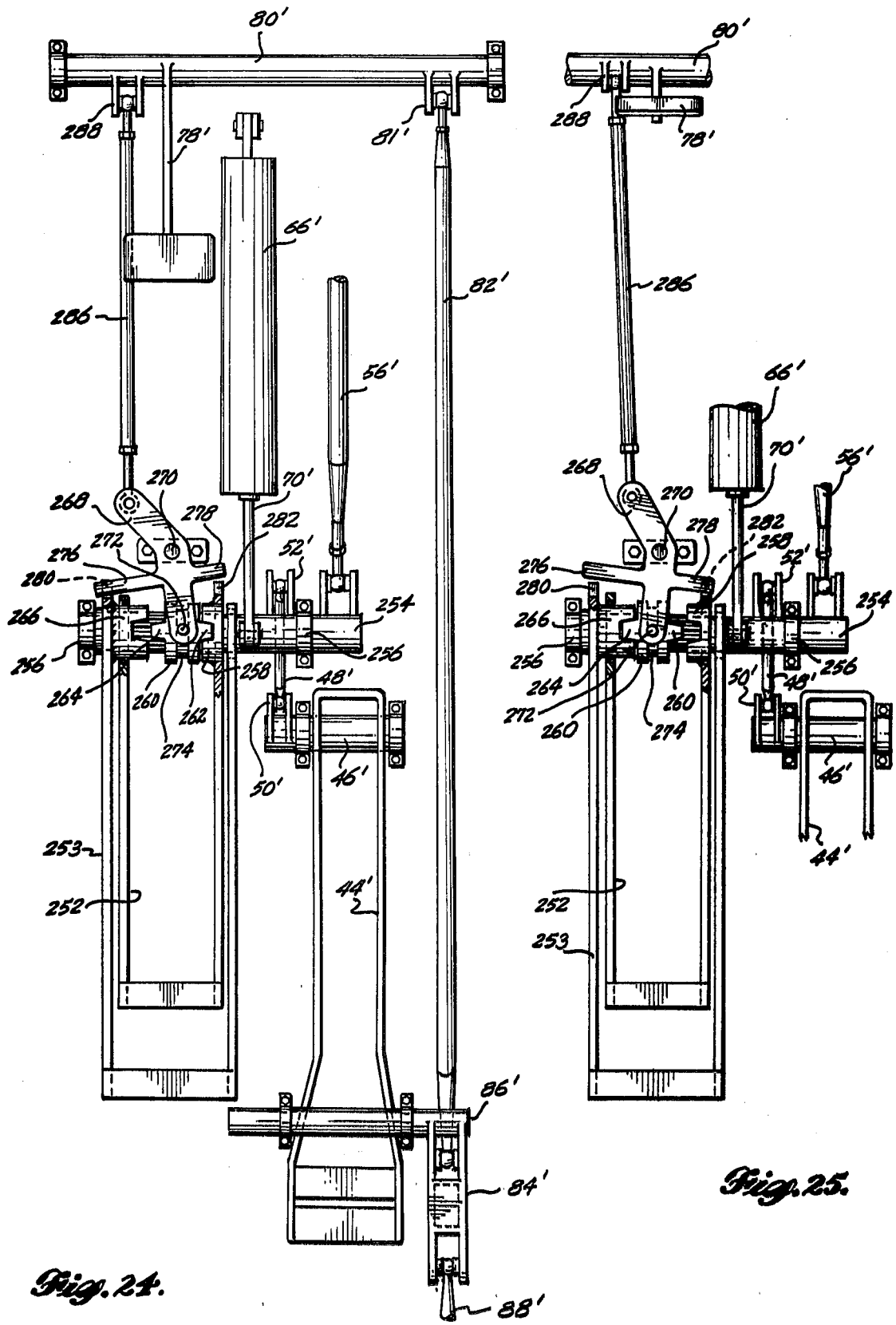

ESCAPE SLIDE DEPLOYING APPARATUS FOR USE IN AN AIRPLANE

BACKGROUND OF THE INVENTION

The present invention relates to emergency escape slides used in conjunction with aircraft, and more particularly, to novel mechanism associated with an aircraft door structure for storing and selectively deploying the escape slide, to a unique over-center linkage for supporting and deploying the escape slide container, and to remote actuating mechanism for the same.

Commercial passenger airplanes are required to carry emergency evacuation equipment. Large commercial airplanes carry emergency evacuation or escape slides that are associated with one or more of the ingress and egress openings in the fuselage. The evacuation slides are sometimes stored in a remote but accessible location and are attached to the passenger deck adjacent the fuselage opening in an emergency situation. Conventionally, the containers for emergency evacuation slides are attached to a fuselage door under normal circumstances and are detached from the door and attached to the passenger deck adjacent the door opening either by direct manipulation of the evacuation slide container or by a manually operated, remote actuating mechanism under emergency conditions.

It is a broad object of the present invention to provide a remotely actuated mechanism for deploying an emergency evacuation slide that is normally attached to a plug-type aircraft door. It is another object of the present invention to provide a slide deployment mechanism with minimum weight, minimum structural compexity, minimum manufacturing and assembly time and cost, and that requires little time to install and maintain. Further objects of the present invention are to provide mechanism for deploying an emergency evacuation slide that can be positively controlled at all times, that is, mechanism that reduces or eliminates the possibility of inadvertent actuation; to provide slide deployment mechanism that will operate under emergency conditions regardless of airplane attitude within certain limits, or regardless of limited structural distortion of the airplane fuselage; to provide slide deployment mechanism that is easy to operate; to provide slide deployment mechanism that has a very few subsystems that are simply interfaced, minimizing undesirable mechanical interaction and providing easy fault isolation; and to provide slide deployment mechanism that will operate independently of an external power source other than gravity.

SUMMARY OF THE INVENTION

In accordance with the foregoing objects and other objects that will become apparent to one of ordinary skill after reading the following specification, the present invention provides an improved apparatus for deploying an escape slide container in combination with a door and means for mounting the door for upward and downward movement relative to a substantially horizontally oriented floor and into and out of engagement with a door opening in the wall associated with the floor. The door moves between a closed position adjacent the floor and in engagement with the door opening and an open position spaced upwardly from the floor and the door opening. The improved apparatus for deploying the chute and for normally attaching it to the door comprises a movable member and a support means associated with the floor, a latch means operatively associated with the movable member for securing the movable member to the door and for releasing the movable member from the door, a linkage means for coupling the container to the movable member and a trip means associated with the linkage means to initiate movement of the linkage means so as to shift the center of gravity of the container from a stable position wherein the linkage supports the container in an upright position to an unstable position wherein the linkage deploys the container. The latch means in a first latching condition cooperates with the movable member, the door, and the support means for the movable member to secure the movable member to the door and release the movable member from the support means. In a second latching condition, the latch means cooperates with the door and the support means to release the movable member from the door and secure it to the support means. The trip means is so associated with the linkage means to initiate movement of the linkage means in reaction to upward movement of the door to relocate the container in its unstable position wherein the center of gravity is shifted to a location causing the container to swing outwardly toward the door opening under urging of gravity.

The invention also provides a unique over-center linkage for use in securing an upright movable member, such as an escape slide container, in a first, stable position and for shifting the center of gravity of the container so as to cause the container to rotate about a base member. The over-center linkage includes first and second upwardly extending links, first, second and third coupling means for coupling the links to each other and to the container, and a trip means for holding the links in a first stable position and for initiating movement of the links to an unstable condition. The first link is swingably mounted on and extends upwardly from a base member and has its upper end connected to the container. The second link has an upper end adapted for connection to the container and a lower end adapted for connection to the first link. Two of the first, second and third coupling means pivotally couple the respectively coupled members to each other, while the remaining one of the first, second and third coupling means is a cam mechanism. The cam mechanism, including a cam and cam follower, is so constructed and arranged as to permit the container to tilt forwardly as the upper ends of the first and second links are moved apart. The trip means holds the first and second links so that they support the container in a stable position. When actuated, the trip means moves the first and second links to a second position wherein the upper ends are spaced further apart, thereby shifting the center of gravity of the container and allowing it to tilt forwardly and downwardly under the urging of gravity. In a preferred embodiment, the second link is pivotally coupled at its upper and lower ends to the container and to the first link, respectively. The cam mechanism is associated with the upper end of the first link and the container so that, when the links are shifted to their unstable position, the container can first tilt downwardly and forwardly about the cam mechanism interconnection and thereafter swing forwardly and downwardly about the rotatable mounting of the first link to the support means.

Another aspect of the present invention provides a unique, manual actuation assembly including first and second interior handles for respectively locking and unlocking the door and for arming and disarming the slide deployment mechanism. First and second exterior handles are respectively associated with the first and second interior handles and are so constructed and arranged relative to the outer surface of the fuselage as to prevent opening of the door from the outside without first disarming the deployment mechanism thereby preventing inadvertent deployment of the escape slide when opening the door with the exterior handles.

BRIEF DESCRIPTION OF THE DRAWINGS

A better understanding of the present invention can be derived by reading the ensuing specification in conjunction with the accompanying drawings wherein:

FIG. 2 is an enlarged view of the lower portion of the door, the container and the deployment mechanism shown in FIG. 1;

FIG. 2e is an elevation view of the right-hand, floor mounted support means;

FIG. 3 is a simplified cross-sectional view taken substantially along section line 3—3 of the actuating mechanism for locking and unlocking the door and for deploying the slide, showing a latch hook but omitting the remainder of the deployment mechanism, showing the door and the slide container in phantom outline, and showing the actuating mechanism in the disarmed mode;

FIG. 4 is a greatly enlarged view of a segment of FIG. 3 showing the door and latch hook for connecting the deployment mechanism and slide container to the door in the disarmed mode;

FIG. 5 is an enlarged view of the hand-manipulated portion of the door opening mechanism as shown in FIG. 3;

FIG. 6 is a view similar to FIG. 3 showing the actuating mechanism in the disarmed mode and unlocked position with the door partially opened and the slide container attached to the door;

FIG. 7 is a simplified cross-sectional view of the over-center linkage forming part of the deployment mechanism with the door closed and the container attached to the door, corresponding to the position of the actuating mechanism in the unarmed mode as illustrated in FIG. 3;

FIG. 8 is a view similar to FIG. 7 showing the door partially opened with the container attached to the door, corresponding to the position of the actuating mechanism in the unarmed mode as illustrated in FIG. 6;

FIG. 9 is a greatly enlarged view of a portion of FIG. 8 showing the latch mechanism with the door partially opened and with the over-center linkage deleted for clarity;

FIG. 10 is a simplified cross-sectional view similar to FIG. 3 showing the actuating mechanism in the armed mode with the door closed;

FIG. 11 is a greatly enlarged view similar to FIG. 5 of the hand manipulated portion of the door opening mechanism showing the safety shield over the interior door opening handle, and corresponding to the position of the actuating mechanism in the armed mode as illustrated in FIG. 10;

FIG. 12 is a greatly enlarged view of the latch hook similar to FIG. 4 but showing the hook attached to the floor and released from the door, and corresponding to the position of the actuating mechanism in the armed mode as illustrated in FIG. 10;

FIG. 13 is a view similar to FIG. 10 showing the actuating mechanism in the armed mode and unlocked position with the door partially opened and the container attached to the floor;

FIG. 14 is a greatly enlarged view similar to FIG. 12 but showing the door partially raised and the latch hook attached to the floor, and corresponding to the position of the actuating mechanism in the armed mode as illustrated in FIG. 13;

FIG. 15 is a simplified view of the door, container and over-center linkage similar to FIG. 8 showing the door partially raised with the container attached to the floor, and corresponding to the position of the actuating mechanism in the armed mode as illustrated in FIG. 13;

FIG. 16 is a greatly enlarged view of the door, container and over-center linkage as illustrated in FIG. 15;

FIG. 16a is an enlarged view in partial section of a portion of FIG. 16 showing the stop flange on the girt bar assembly omitted in the preceding side views for simplicity in illustration;

FIG. 17 is a view similar to FIG. 15 showing the container and over-center linkage in the armed mode after the door has risen above the container and immediately after the center of gravity of the container has been shifted;

FIG. 18 is an enlarged view of the over-center linkage shown in FIG. 17;

FIG. 19 is a view similar to FIG. 17 showing the container rotating downwardly and outwardly about the over-center linkage;

FIG. 21 is a greatly enlarged cross-sectional view taken substantially along section line 21—21 of FIG. 2a showing the girt bar separation mechanism for separating the container from the floor and corresponding to the position of the over-center linkage as illustrated in FIG. 16;

FIGS. 24 and 25 are enlarged views of an alternate embodiment of the actuating mechanism for opening and closing the door and for the arming and disarming the container deployment mechanism, showing the actuating mechanism in the locked position and, respectively, in the armed and disarmed modes, respectively.

DETAILED DESCRIPTION

Figure 1:
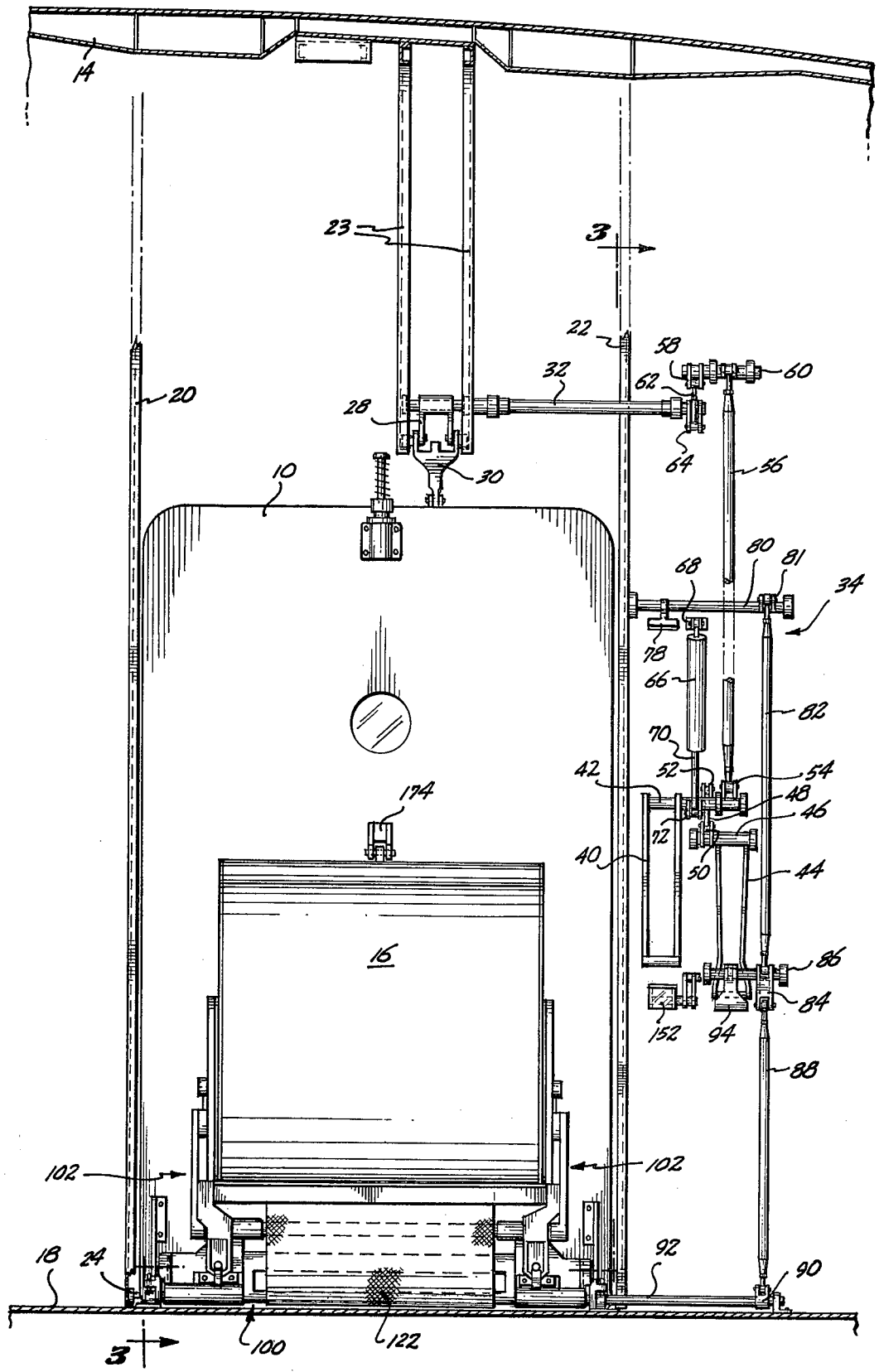
FIG. 1 is a view of a segment of an aircraft fuselage, an overhead, track-mounted, sliding door in a closed position, an escape slide container and associated mechanism attached to the door, and the slide deployment, actuating and door opening mechanism, in partial cross-section looking outwardly from inside the fuselage.

Referring first to FIGS. 1 and 3, an overhead, track-mounted door 10 is positioned in a door opening 12 in the fuselage 14 of an aircraft. An emergency escape slide (or chute) container 16 is mounted on the inside of the door 10 and normally rises upwardly with the door as the door is raised. Under emergency conditions, the door can be raised while the slide container 16 is released from the door and attached to the passenger deck 18 in the fuselage 14 in readiness for deployment of the escape slide. The three-track mounted, overhead sliding door 10 is similar to that disclosed in U.S. Pat. No. 3,802,125 issued Apr. 9, 1974 to I. G. Baker and assigned to The Boeing Company. The door, although very simply depicted, is of the plug type that seals against periphery of the the door opening in the fuselage to maintan a desired internal cabin pressure. The door 10 is mounted in left and right tracks 20 and 22 and an overhead track 23 comprising two guideways. Track followers 24 and 26 mounted at the lower corners of the door engage, respectively, the left and right tracks 20 and 22. An overhead truck or carrier 28, which rides in the upper track 23, is pivotally attached to the upper edge of the door. The overhead sliding door can be counterbalanced for manual raising and lowering or can be powered in its upward and downward opening and closing traverse of the tracks 20, 22 and 23 by an electric motor or other prime mover. The truck 28 is pivotally coupled by a link 30 to a locking and unlocking shaft 32, which is journalled above the door to a structural portion of the fuselage (not shown) and extends sidewardly from the door beyond the right track 22. The locking and unlocking shaft 32 is mechanically coupled to the manually operated, door opening and closing (or unlocking and locking) mechanism and manually operated, deployment arming and disarming mechanism, generally designated 34.

The manually operated door opening and arming mechanism 34 for deployment of the slide container will first be described in conjunction with FIGS. 1, 3 and 10. The arming mechanism is illustrated in FIGS. 1 and 3 in a disarmed mode ready for opening the door without deploying the escape slide. When the door is in its normally closed position, for example during normal flight conditions (as shown in FIG. 10), the arming mechanism is in its armed mode ready for deployment of the slide by merely opening the door. First, however, the normal operation of the door will be described in conjunction with first disarming the mechanism and thereafter opening the door so that the escape pack will remain attached to the door and rise with the door as it traverses overhead of the door opening 12.

The door opening and closing mechanism includes an interior handle 40 affixed to a horizontally oriented shaft 42, which is parallel to the fuselage and journalled on internal fuselage structure (not shown). An exterior handle 44 is affixed to a horizontally oriented shaft 46, which is parallel to the fuselage and journalled for rotation on internal fuselage structure (not shown). A link 48 interconnects the interior and outside handles for simultaneous movement between a closed and latched position as shown in FIGS. 1, 3 and 10, and an unlocking position (described below in conjunction with FIG. 6). The lower end of link 48 is connected to an upwardly extending arm 50 affixed to the exterior handle mounting shaft 46 while the upper end of the link 48 is pivotally coupled to an upwardly extending arm 52 affixed to the interior handle mounting shaft 42. A second arm 54 is affixed to and extends upwardly from the interior handle mounting shaft 42 and is pivotally coupled to a long, upwardly extending link 56. The upper end of link 56 is pivotally coupled to a bell crank-like member 58 affixed to shaft 60, which in turn is mounted for rotation about a horizonal axis on internal fuselage structure (not shown). The other end of the bell crank-like member 58 is pivotally connected to a link 62 in turn connected to a downwardly extending arm 64 affixed to the locking and unlocking shaft 32. The upper end of an over-center, compressed air counterbalance 66 (a conventional, high pressure gas counterbalance) is pivotally connected to a bracket 68 affixed to the fuselage. The piston rod 70 of the compressed air counterbalance is pivotally connected to an inwardly extending arm 72 affixed to the interior handle mounting shaft 42. The compressed air counterbalance retains the locking and unlocking handles 40 and 44 in their latched positions via a restraining force on the arm 72.

The actuating handle for arming and disarming the escape slide pack extends inwardly (in FIGS. 1 and 3) from a horizontally oriented, arming handle shaft 80 in turn journalled to internal fuselage structure (not shown) for rotation about an axis parallel to the fuselage. An upwardly and inwardly extending arm 81 affixed to the arming handle shaft 80 is pivotally coupled to a connecting link 82 that extends downwardly to adjacent the location of the interior and exterior handle mounting shafts. The other end of the connecting link 82 is pivotally coupled to the inwardly extending, short arm of a bell crank 84 affixed to a horizontally oriented shaft 86, in turn mounted on internal fuselage structure (not shown). The long arm of bell crank 84 extends downwardly and inwardly from the shaft 86 and is pivotally coupled to a second connecting link 88 in turn extending downwardly to a location adjacent the passenger deck 18. The bottom end of the connecting link 88 is pivotally coupled to an arm 90 extending inwardly and upwardly from arming and disarming torque tube 92. The torque tube 92, which extends horizontally along the passenger deck to a location adjacent the bottom right-hand corner of the door 10, operates, by means to be described in more detail below, the mechanism for selectively connecting the pack to the door for upward traverse therewith under normal circumstances, or connecting the escape slide container 16 to the floor in readiness for deployment through the door opening.

An exterior disarming handle 94 is also affixed to the shaft 86 and is thereby mounted for simultaneous movement with the interior arming handle 78. The hand grip portion of the exterior disarming handle 94 is located adjacent the bottom of the exterior door opening handle 44 so that the exterior door opening handle cannot be grasped until the exterior disarming handle is moved to its disarmed position as shown in FIGS. 1 and 3.

Figure 2A:
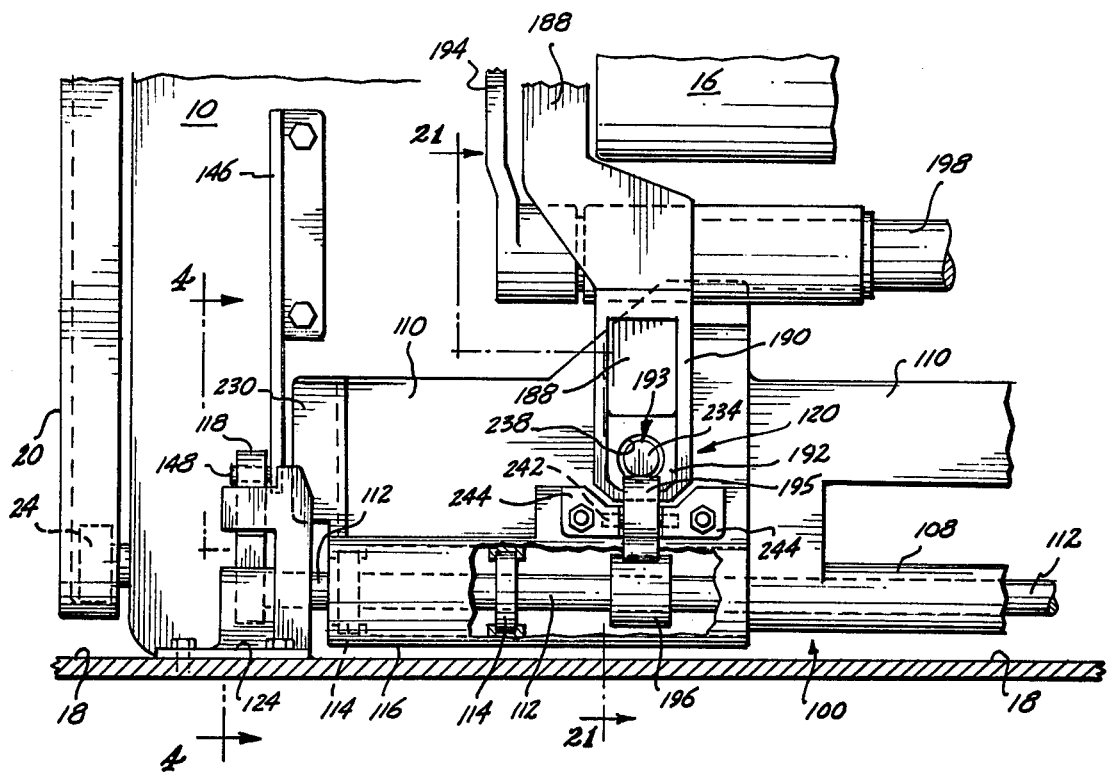
FIG. 2a is a greatly enlarged view of the lower, left-hand portion of the door, deployment mechanism, and container illustrated in FIG. 2.

Before discussing the operation of the door opening and disarming handles and the associated mechanism, a better understanding of construction of the the girt bar assembly, generally designated 100, is necessary. The girt bar assembly attaches the slide container 16 to the passenger deck 18 when the actuating mechanism is in an armed mode for deployment of the container. The container is normally supported above the girt bar assembly 100 by an over-center linkage, generally designated 102, which functions as a part of the deployment mechanism for the escape slide. Referring to FIGS. 2 and 2a, the girt bar assembly comprises a tubular lower portion 108 and a normally upwardly oriented plate member 110 extending substantially the length of the tubular portion 108. A torque tube 112 extends through and beyond the tubular portion 108 of the girt bar and is journalled in bearings 114 mounted in bosses 116 located at opposite ends of the tubular portion 108 of the girt bar. The torque tube extends beyond opposite ends of the girt bar assembly. Hooks 118 (also viewed in FIG. 4, which omits the over-center linkage and all of the girt bar assembly except the torque tube and the hook) are attached to each end of the torque tube 112. The over-center linkage 102 is in turn detachably connected by latch fittings 120 to the plate member 110 of the girt bar assembly and normally supports the slide container 16 above the girt bar. A girt strap 122 is affixed to the plate portion 110 of the girt bar assembly 100 (by means not shown) and extends upwardly therefrom and is also affixed through the bottom end of the slide container 16 to the chute or slide packed within the container. The girt strap 122 is composed of a flexible fabric material that constitutes a flexible coupling between the tubular portion 108 of the girt bar assembly and the slide container once it is detached from the girt bar after deployment.

Figure 2B:
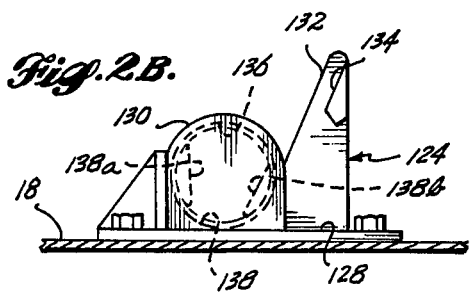
FIGS. 2b, 2c and 2e are end, top and side elevation views, respectively, of the left-hand floor mounted support means forming part of the deployment mechanism.
Figure 2D:
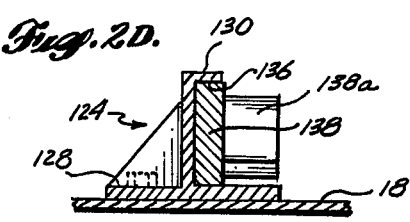
FIG. 2d is a sectional view taken along section line 2d—2d of FIG. 2c.
Figure 2C:
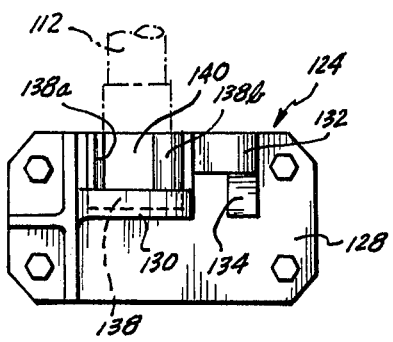
Figure 2E:
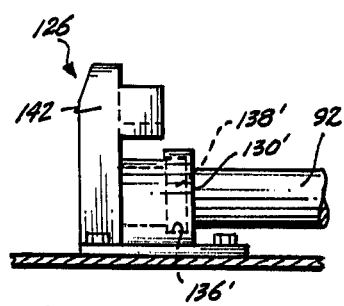

The outer ends of the girt bar torque tube 112 and the hooks 118 rest in floor fittings 124 (also seen in FIG. 4) positioned adjacent the bottom and sides of the door 10 and affixed by conventional means to the passenger deck floor 18. The floor fitting 124 on the left-hand side of the door is best illustrated in FIGS. 2b, 2c and 2d while the right-hand floor fitting 126 is best illustrated in FIG. 2e. Referring to FIGS. 2b through 2d, the left-hand floor fitting has a base member 128, a journal 130, an upright girt bar stop 132 and a hook stop 134 that extends transversely from the upper portion of the girt bar stop 132 in a direction perpendicular to the plane of rotation of the girt bar torque tube 112 and the hook 118. A horizontal bore 136 having an axis oriented parallel to the girt bar torque tube 112 is provided in the journal 130 and opens to the right toward the girt bar assembly in a circularly shaped opening. The upper portion of the journal adjacent the door opening is removed, leaving an upwardly opening U-shaped trough 136a in the journal. The trough forms an extension of the bore 136 in the portion of the journal adjacent the location of the end of the girt bar torque tube 112 and the hook 118. A rotatable latch member 138 has one end rotatably mounted in the bore 136 and has two, spaced, axially extending arms 138a and 138b that extend into the trough 136a and define a downwardly convergent slot 140 through the latch member. The outer circumferential surfaces of the arms 138a and 138b conform to the circumferential curvature of the trough 136a while the inner surfaces of the arms are flat and inclined relative to each other to form a downwardly convergent, trapezoidally shaped slot 140.

The right-hand floor fitting 126 is constructed similarly to the left-hand floor fitting 124 just described except that it constitutes the mirror image of the left-hand floor fitting, and, further, the bore 136' in the right-hand fitting 126 extends completely through the journal 130'. The end of the rotatable latch member 138' journalled in the bore 136' situated on the opposite side of the right-hand fitting 126 from the girt bar assembly 100 is affixed to the disarming torque tube 92 in turn coupled to the manually operated, arming and disarming mechanism.

As shown in FIGS. 2a and 4, the bottom portion of the hook 118 is trapezoidally shaped at its connection to the girt bar torque tube 112 and is secured to the torque tube 112 by a suitable fastener 144. When the door is in its closed position, the bottom portion of the hook 118 fits into the trapezoidally-shaped slot 140 formed by the arms 138a and 138b of the rotatable latch member 138. The rotating latch member is constructed and rotated to a position such that when the arming and disarming mechanism is in its disarmed mode, the hooks 118 can be lifted out of the rotatable latch member 138. The right-hand latch member 138, and the right-hand hook 118 are similar in construction and function to the corresponding left-hand components. Whenever reference is made to the left-hand components below, it will be understood by one of ordinary skill that the right-hand components are the same, with the exception that the right-hand components are generally constructed as the mirror image of those on the left-hand side. If the right-hand components differ significantly, they will be mentioned and specifically described.

Brackets 146 and 146' affixed to the bottom portion of the door adjacent the locations of the hooks 118 and 118', have transversely extending lift pins 148 and 148' affixed thereto. Referring to FIGS. 2a and 4, the left-hand hook 118 fits over the lift pin 148 when the assembly is in the disarmed mode so that when the door is raised, the hook member, and thus the girt bar assembly 100, the over-center linkage 102 and the slide container 16, are lifted out of the rotatable latch member 138 and carried upwardly by the door to an overhead, out of the way location so that normal passenger ingress and egress can be effected through the door opening.

Referring again to FIG. 10, the actuating mechanism for opening the door and for arming the escape slide deployment mechanism is shown in the normally closed position in the armed mode. In this position and mode, the arming handle 78 is in a downwardly and inwardly extending position, which shifts the connecting link 88 downwardly, in turn positioning the bell crank 84 so that the connecting link 88 rotates the girt bar torque tube 112 and thus the hook 118 to the armed position, (that is, disengaged from the supporting pin 148 affixed to the door bracket 146 as shown in FIGS. 10 and 12). Before the door is opened under normal (non-emergency) conditions, the arming handle 78 is rotated counterclockwise so as to rotate its mounting shaft and thus arm 81 to raise the connecting link 82 as shown in FIG. 3. As the upper connecting link 82 of the arming mechanism is raised, the bell crank 84 is rotated in a counterclockwise direction to lift lower connecting link 88 and thus rotate the girt bar torque tube 112 in a counterclockwise direction, positioning the hooks 118 and 118' over the lift pins 148 and 148' on the door (as shown in FIGS. 3 and 4). The hooks 118 and 118' are spaced above the pins 148 and 148' when the door is closed and the container is resting in the floor fittings to allow the hooks to be easily engaged and disengaged from the pins.

Referring to FIGS. 3, 5, 10 and 11, when the arming mechanism is the armed mode, a safety shield 152 is positioned in front of the interior door opening handle 40. The safety shield 152 is pivotally mounted on a bell crank 156, which is in turn journalled on a shaft 158 mounted on fuselage structure (not shown) inboard from and substantially parallel to and adjacent the bell crank shaft 86. The bell crank 156 is coupled by a link 162 interconnecting one arm of the safety shield bell crank 156 to the arming bell crank 84. As the arming bell crank is rotated to a disarmed position in reaction to movement of the arming handle 78, the shield bell crank 156 is rotated in a clockwise direction about the shaft 158 to remove the shield from its position in front of the hand grip 160 of the interior door opening handle 40 (as shown in FIG. 12) to a position clearing the hand grip for use (as shown in FIG. 5). At the same time, the exterior disarming handle 94, affixed to the arming bell crank 84, is rotated inboard in a counterclockwise direction. The exterior disarming handle 94 is so positioned in its normally armed position (FIG. 11) as to prevent access to the hand grip portion 164 of the exterior door opening handle 44. However, when the arming mechanism is in a disarmed mode (FIGS. 3 and 5), the hand grip portion 164 of the exterior door opening handle 44 can be grasped from the outside. Also, if the door is opened from the outside, inward movement of the exterior disarming handle 94 will serve to rotate the arming bell crank 84 in a counterclockwise direction to place the arming mechanism in a disarmed mode.

The door opening mechanism shown in FIG. 3 is now in its ready position for unlocking and raising the door 10 from the door opening 12. The door is unlocked by grasping the hand grip 160 on the interior door opening handle 40, or by grasping the hand grip 164 on the exterior handle 44, and by swinging the handles upwardly about their respective mounting shafts 42 and 46. As one or the other of the handles 40 and 44 is swung upwardly to the position shown in FIG. 6, the door unlocking link 56 attached to arm 52 on the interior handle mounting shaft 42 is pulled downwardly. The motion of the unlocking link 56, through the bell crank-like member 58, link 62 and arm 64 rotates the unlocking shaft 32 to pull the truck 28 inwardly along the upper central track 24, thus unplugging the door from the door opening 12 and causing it to begin its upward and overhead traverse along the mounting tracks 24, 20, and 22. The door 10 can then be lifted by the operating crew member by grasping hand holds on the door (not shown) to the overhead position shown in double-dashed phantom outline at the upper portion of FIG. 6, thus clearing the door opening 12 for normal ingress and egress.

When closing the door under normal circumstances, the door is lowered from its overhead position toward its plugged position. After it is adjacent its plugged position, either the interior or exterior opening handle 40 or 44 is rotated downwardly to the position shown in FIG. 10 and thereafter the arming handle 78 is rotated downwardly to the position shown in FIG. 10 to arm the escape slide deployment mechanism and to rotate the exterior disarming handle 94 to its position below the exterior opening handle 44 and flush with the outer skin of the fuselage.

Still referring to the normal opening sequence of the door, reference is made to FIG. 7 wherein the escape slide container 16 and associated mechanism is shown attached to the door, the arming mechanism is shown in the disarmed mode, and the door is shown in a closed position. The hook 118 is positioned over the lift pin 148 on the bracket 146 affixed to the door 10 and the rotatable latch member 138 is positioned so that the hook member and thus the girt bar assembly 100, the over-center linkage 102 and the container 16 can move upwardly with the door. The container 16 in this position is secured at its upper end by a secondary latch associated with the upper end of the container and the door. A latch flange 168 is affixed to and extends upwardly from the upper, central, outboard portion of the container. A horizontally oriented pin 170 is affixed to the flange and spaced above the upper end of the container and engages a downwardly opening, U-shaped latch member 172, affixed to a flange 174 projecting inwardly from the inboard side of the door. When the door is closed and the container is resting on the floor fittings 124, the U-shaped latch member 172 is positioned over the pin 170, thus cooperating to prevent the container from falling inboard as the door 10 is unplugged from the door opening 12 and begins its overhead traverse along the tracks.

Referring now to FIGS. 8 and 9, the door is illustrated in a partially raised position. The girt bar assembly 100, over-center linkage 102, and the slide container all rest on the hook 118 and are carried upwardly by the door as it begins its overhead traverse. The upper portion of the container is secured to the door since there is no change in the vertical relationship beteen the upper latch pin 170 and the latch member 172 on the door.

Referring now to FIGS. 1, 2a, 10, 11 and 12, the deployment mechanism is in its armed mode. As previously stated, the deployment mechanism is armed when the door is normally closed during flight. In this position, the safety shield 152, shown in enlarged scale in FIG. 11, is positioned in front of the hand grip 160 on the interior handle 40. The safety shield 152 is rotatably mounted on the inwardly extending arm of bell crank 156 by pin 180. A torsionally wound coil spring (not shown) rotationally biases the safety shield 152 about the pin 180 to a position where the shield is located inboard and adjacent the hand grip 160 of the interior handle 40. To open the door 10 when the deployment mechanism is in the armed mode, a force is applied to the upper end of the safety shield 152 and it is rotated about pin 180 to expose the hand grip 160 of the interior unlocking and opening handle 40.

Referring to FIGS. 10 and 12, the arming handle 78 is shown rotated downwardly to its armed position. Through links 82 and 88 and bell crank 84, the arm 90 on the disarming torque tube 92 (FIG. 1) is rotated in a clockwise direction, thus rotating the girt bar torque tube 112 (FIG. 2a) in a clockwise direction. Since the door is closed and the container 16 is positioned adjacent the floor, the trapezoidal bottom portion of the latch hook 118 is seated within the slot formed by arms 138a and 138b of the rotatable latch members 138 situated in both of the floor fittings 124 and 126. It again should be understood that the entire description of the embodiment will be described in relation to the left-hand side of the assembly. The right-hand side of the deployment mechanism operates in the same manner but constitutes the mirror image of the portion of the assembly on the left-hand side of the structure. Thus, further description of the right-hand portion of the mechanism has been omitted. As the girt bar torque tube 112 is rotated in a clockwise direction, the hook 118 is also caused to rotate in a clockwise direction, disengaging the upper portion of the hook from the latch pin 148 on the door bracket 146. This rotation serves two functions: first to disengage the container 16 from the door and second to secure the girt bar assembly 100 to the floor fittings 124. It will be noted that the hook 118 is rotated so that its inboard end rests against the hook stop 134 on the floor fitting 124. The rotatable latch member 138 in the armed position cooperates with the trapezoidal bottom portion of the hook 118 to prevent removal of the hook and thus the girt bar assembly and the container from the floor fitting 124.

When it is desired to open the door 10, the safety shield 152 is rotated to clear the hand grip 160 of the interior unlocking and opening handle 40 as shown in FIG. 13. The interior handle 40 is then rotated upwardly in a counterclockwise direction so as to rotate its mounting shaft 42 in the same direction. As the handle is rotated, the door unlocking and opening linkage is operated in the same manner as explained in conjunction with FIG. 6 when the door was opened with the arming mechanism in an unarmed mode. Thus the door begins its upward traverse as shown in phantom outline in FIGS. 13, 14 and 15. As this occurs, the container remains attached to the passenger deck 18 via the hook 118, rotatable latch member 138 and the floor fitting 124. As the door begins its upward traverse, the U-shaped latch member 172 moves upwardly with the door and frees the upper latch pin 170 affixed to the upper end of the container (FIG. 15). The door can then continue in its upward traverse, freeing the pack from the door and clearing the door opening 12 in the fuselage 14.

As the door moves upwardly to clear the container, it serves one additional function, namely to trip the over-center linkage 102 and shift the center of gravity 182 of the container 16 so that it will deploy itself through the door opening 12 under the urging of gravity and without further manual assistance. Before explaining the means for tripping the over-center linkage 102, detailed description of the construction and arrangement of the parts of the over-center linkage will be presented.

Referring to FIGS. 2, 2a, 15 and 16, the plate portion 110 of the girt bar assembly 100 has an upwardly extending flange 184 that mates with a hook 186 positioned on the outboard side of a separable link 188. The flange 184 extends upwardly from the plate portion 110, forming part of the girt bar assembly when the container is in its normal, stable condition. A downwardly extending arm 190 on the separable link 188 has a transverse end portion 192 containing an aperture that, when assembled, mates with a protrusion 193 on the plate portion 110 of the girt bar assembly situated below the upwardly extending flange 184 on the plate portion 110. A cam follower or panel 195 holds the downwardly extending end portion 192 of the separable link 188 in position so that the aperture engages the protrusion 193. Thus the cooperation of the upwardly extending flange 184 engaging the hook 186 on the separable link and the downwardly extending end portion 192 held in place on the protrusion by the cam follower 195 maintains the plate portion 110 and the separable link 188 as an integral unit prior to the time the pack assembly 16 is completely deployed. (The cam follower or panel 195 and the mechanism for releasing the follower and thus allowing the separable link 188 to separate from the plate portion 110 of the girt bar is shown in FIG. 21 and will be described in further detail below.)

The separable link 188, a second link 194 that is pivotally coupled to both the separable link 188 and the container 16, and a cam member 196 mounted on the outboard half 16a of the escape slide container cooperate to form the over-center linkage 102 for deploying the safety slide container under the urging of gravity. The second link 194 has its lower end pivotally attached by shaft 198 to the separable link 188 at a location inboard from the position of the hook 186 on the separable link. The shaft 198 extends under the escape slide container and couples with the corresponding second link on the right-hand side of the pack, thereby coupling the second link 194 to the right-hand separable link. The upper end of the second link 194 is pivotally coupled by shaft 200 to an inboard extension of the cam member 196.

The cam member 196 has a double sided cam surface formed by two sidewardly extending, equally spaced flanges 202 and 204. The mutually opposing surfaces of the flanges 202 and 204 form the cam structure in which a follower 206, mounted on the upper end of the separable link 188 for rotation about an axis parallel to the axis of shaft 198, is positioned. The shape of the cam surface formed by the flanges 202 and 204 will be explained as they are oriented relative to the vertical extent of the container when it is positioned in its upright, undeployed location. The cam surface has a lower portion that extends outwardly and slightly upwardly from an inboard location. The lower portion is joined by a slightly outwardly concave, but generally vertically oriented cam portion 210. The outboard one of the two flanges 202 and 204 terminates at the upper end of the vertical cam portion 210 while the inboard flange 204 joins with the cam portion 210 and extends inboard to form a third cam portion 212. When the pack is in its undeployed position, the follower 206 mounted on the upper end of the separable link 188 is situated in the inboard end of the lower portion of the cam surface.

A trip link 214 cooperates with another cam surface, generally designated 216, formed in an enlarged central portion of the second link 194. The trip link and second cam surface cooperate to normally hold the over-center linkage 102 in its stable, upright condition. The trip link 214 has its inboard end pivotally mounted by pin 218 to the central portion of the separable link 188 behind the second link 194 and extends outboard so that its outer end extends beyond the location of the outboard edge of the separable link 188 and of the outboard edge of the container 16. The cam surface 216 has a lower detent portion 220 in which a follower 222, rotatably mounted on the central portion of the trip link 214, normally rests when the pack assembly is in its stable position. (The trip link 214 is best seen in this locking position in FIG. 8 wherein the over-center link 102 is locked so as to prevent pack deployment when the pack assembly is being raised with the door under normal conditions.) An inwardly extending flange 224 is mounted on the inner side of the door 10 at a location above the floor and below the location of the outboard end of the trip link 214. As the door is raised when the pack assembly is locked into the floor fittings 124 and 126, the flange 224 engages the outboard end of the trip link 214 and thus moves it out of engagement with the detent portion 220 of the cam surface 216 and move it into the upper portion of the cam surface 216, allowing the upper ends of the separable link 188 and the second link 194 to move apart. The links are caused to move apart by the weight of the container resting on the shaft 200 at the upper end link 94. As the links move apart, the container is moved outboard, thereby shifting or moving its center of gravity 228 outboard from a vertical line through the shaft 200 that couples the upper end of the second link to the inboard extension on the cam member 196.

Referring to FIG. 16a, a sideward extension 230 (shown also in FIGS. 1, 2 and 2a) on each of the plate portions 110 of the girt bar assembly are caused to move inwardly as the door rises so that they abut the outboard portion of the upright stop member 132 on each of the floor fittings 124 and 126. This sideward extension 230, which extends slightly inboard and then tranversely relative to the door and the container assembly as viewed in FIGS. 2 and 2a, has been omitted in many of the intermediate views of clarity of illustration. The transverse extension cooperating with the upright stop 132 prevents the container from falling inwardly relative to the door opening after it is released from the door.

As the door 10 clears the upper end of the container 16 during its upward traverse, shown in FIGS. 17 and 18, the container rotates in a counterclockwise direction about the shaft 200 interconnecting the cam member 196 and the second link 194 while the cam follower 206 traverses toward the upper end of the vertical cam portion 210. The trip cam surface 216 is sufficiently large so as to allow a relatively wide separation between the cam follower 206 and the shaft 200 as the container 16 rotates outwardly toward the door opening 12 in the fuselage 14. As the container 16 rotates, the center of gravity 228 also moves outboard. When the follower 206 reaches the upper end of the vertical cam portion 210, the trip cam surface 216 is so sized as to prevent further separation of the cam follower 206 from the shaft 200. Thus the coaction of the trip link 214, the trip link follower 222 and the trip cam surface 216 are such as to lock the separable link 188 and the second link 194 in their respective positions shown in FIG. 18. However, at this point the cam follower 206 engages the cam portion 212 formed by flange 204 on the cam member 196. Since the center of gravity 228 is located outboard from the shaft 200, the entire container and deployment assembly will rotate solely about the pins 200 as the cam follower 206 traverses the cam portion 212 to a position where the center of gravity is positioned outboard from the bottom portion of the girt bar assembly 100 as shown in FIG. 19.

Figure 20:
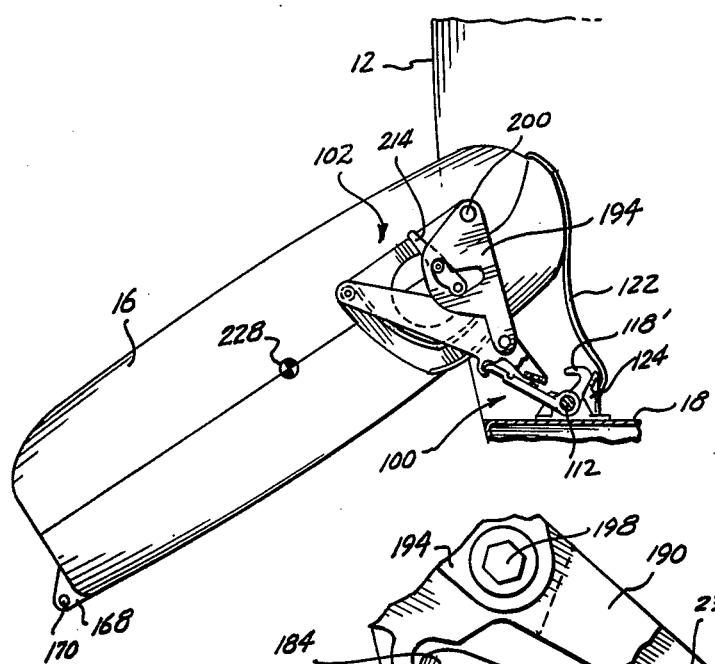
FIG. 20 is a view similar to FIG. 19 showing the container in a nearly fully deployed position wherein the container is being separated from the lower portion of the girt bar assembly.

Since the bottom portion of the girt bar assembly 100 is rotatably mounted on the girt bar torque tube 112 by bearings 114 (FIGS. 2 and 2a) and since the girt bar torque tube 12 is rigidly affixed to the floor by the rotatable latch members 138 in the floor fittings 124, the container 16 will thereafter rotate in a counterclockwise direction about the girt bar torque tube 112 and fall outwardly to and beyond the position shown in FIG. 20. As the container swings outwardly, the plate portion of the girt bar, which is normally upright, rotates to a position approaching parallelism with the passenger deck 18. Thus the escape slide container has swung to a position where the upper end of the container is located outside the door opening 12 in the fuselage 14 and lower than the passenger deck 18.

Figure 22:
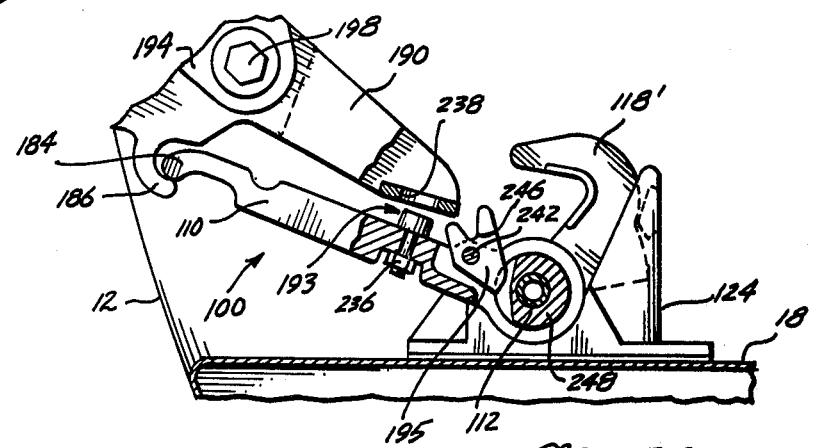
FIG. 22 is a view similar to FIG. 21 showing the over-center linkage separating from the bottom portion of the girt bar assembly in correspondence with the position of the over-center linkage as illustrated in FIG. 20.
Figure 23:
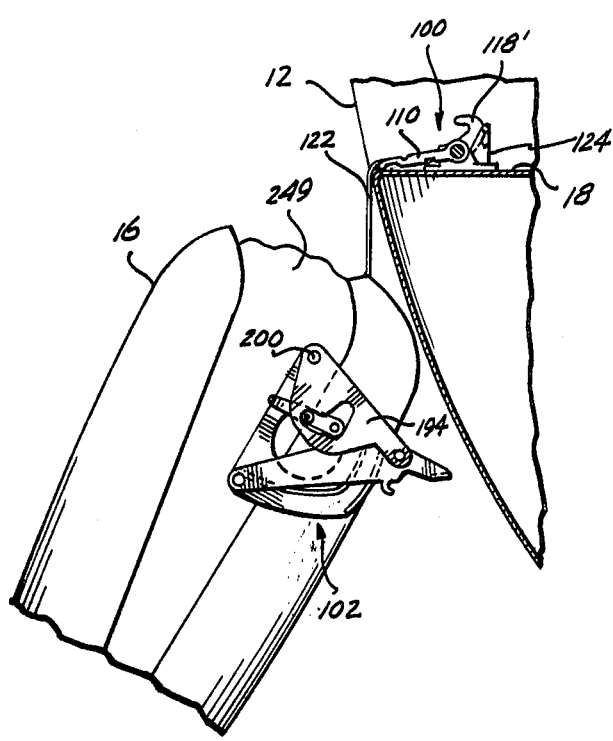
FIG. 23 is a view similar to FIG. 20 showing the container fully deployed out the fuselage door and connected to the bottom portion of the girt bar assembly via a girt strap.

At this point of the container's swinging motion during deployment, the separable link 188 begins to separate from the plate portion 110 of the girt bar assembly 100. This separation is made possible by a unique self-releasing coupling mechanism that is actuated by rotation of the girt bar assembly 100 about the girt bar torque tube 112 during deployment of the slide. Referring now to FIGS. 2, 2a and 21 (the latter of which illustrates the container 16, the over-center linkage 102 and the girt bar assembly in the armed mode and positioned substantially as also shown in FIG. 16), the tubular portion 108 of the girt bar assembly 100, as previously mentioned, is rotatably mounted by bearings 114 (FIG. 2a) on the girt bar torque tube 112. The self-releasing coupling of the separable link 188 and the plate portion 110 maintains the girt bar assembly as an integral unit when the container is upright prior to deployment. The protrusion 193 is formed by the head of a bolt 234 inserted through a bore in the plate portion 110 of the girt bar assembly and fastened in place with a nut 236. The aperture 238 in the downwardly extending flange of the separable link 188 is formed in the transverse member 192 that abuts the inboard surface of the plate portion 110 of the girt bar assembly when the container is in its upright, undeployed position. Cam follower 195 is mounted for rotation about an axis parallel to the girt bar torque tube 112 on a shaft 242 affixed by brackets 244 mounted on the plate portion 110 of the girt bar assembly. The cam has a bight 246 into which the transverse flange member 192 of the separable link 188 is inserted. The opposite follower end of the cam follower 195 rides on a cam 248 affixed to the girt bar torque tube 112. The cam 248 is essentially circular but has an outwardly facing section 250 of reduced diameter. The cam follower 195 bears on the circular surface portion of the cam 248 when the container and the plate portion 110 of the girt bar assembly are upright and continues to do so until the plate portion 110 of the girt bar assembly has rotated relative to the girt bar torque tube 112 through about a 70° angle from its upright position. Thereafter, the follower end of the cam follower 195 meets the reduced diameter portion 250 of the cam as shown in FIG. 22 allowing the cam follower to rotate about its mounting shaft 242. As the cam rotates, the transverse member 192 of the separable link 188 is released by the cam follower 195 and allowed to disengage from the bolt head 234. The separable link 188 can then pivot about the upward extension 184 on the plate portion 110 of the girt bar assembly. Since the outboard end of the plate portion 110 is positioned adjacent the door opening 12, the container is then released from the lower portion of the girt bar assembly 100 and allowed to drop downwardly from the door opening 12 on the outboard side of the fuselage 14, as shown in FIG. 23.

The girt strap 122, as previously mentioned, is connected to the plate portion 110 of the girt bar assembly 100 and to the escape slide packed within the slide container 16, thus providing a flexible connection between the girt bar and the separated slide allowing the pack and slide to swing inwardly toward the aircraft fuselage and contact it after deployment. The container is then separated into its outboard portion 16a and the cover portion 16b by conventional container released means (such as ripcord actuated pin latches), deploying the slide 249 from the container 16.

Referring now to FIGS. 24 and 25, an alternate embodiment of the locking and unlocking handle and the hand-operated actuating mechanism for arming and disarming the pack assembly is illustrated. In FIG. 24, the mechanism is shown in the disarmed position. The mechanism is similar in many respects to that previously described in conjunction with FIGS. 1, 3, 6 and 10. In FIGS. 24 and 25, like parts are identified with the same numerals primed for ease of explanation and comparison. Those parts different from the first-described embodiment are identified with new reference numerals. In FIG. 24, the mechanism is shown in the armed condition wherein the arming handle 78' is rotated to its downward position, rotating its mounting shaft 80' in a clockwise direction (when viewed from the left).

Through link 82', shaft 86' and link 88', the latch hook 118 (not shown) is released from the latch pins on the door. In this embodiment, there are two interior door opening handles 252 and 253. Both handles are mounted for rotation on handle mounting shaft 254, which is in turn mounted in bearings 256 attached to fuselage structure (not shown). Shaft 254 corresponds to shaft 42 of the prior embodiment. Each of the door unlocking and opening handles 253 and 252 have two parallel arms, each of which is constructed to rotate about the shaft. The emergency opening handle 252 has a boss 258 on the upper end of its rotatable left arm that is rotatably mounted on the shaft 254. The corresponding adjacent arm of the normal (nonemergency) door opening handle 253 is rotatably mounted on the shaft 254 adjacent the boss 258 of the normal opening handle 253. The upper end of the left-arm of the normal opening handle 253 carries a boss 266 that is rotatably mounted on the shaft 254. The adjacent left-hand arm of the emergency opening handle is rotatably mounted on the left-hand boss 266. Thus both handles are mounted for rotation about axes coincident with the rotational axis of shaft 254.

The shaft 254 is splined between the end mounting arms of the handles 253 and 252. A mating splined follower 260 is slidably mounted on the shaft splines for movement in an axial direction along the shaft 254. The follower 260 has keys 262 and 264 that can mate with corresponding grooves in the boss 258 of the emergency opening handle 252 and boss 266 of the normal opening handle 253. A follower actuating bell crank 268 is pivotally mounted on a fixed shaft 270 (in turn affixed to fuselage structure not shown). The shaft 270 is mounted transversely to the axis of handle mounting shaft 254. The lower arm of the bell crank 268 carries a pin 272 which extend inwardly and mates with an annular groove 274 in the periphery of the splined follower 260. As the bell crank is rotated about its mounting pin 270, the splined follower 260 can be moved back and forth on shaft 254 so as to engage keyways in the emergency opening handle boss 258 or the keyway in the normal handle boss 266.

The bell crank 268 also carries two transverse arms 276 and 278 positioned above the location of the handle mounting shaft 254. As the bell crank 268 is rotated to position the follower 260 in one or the other of bosses 258 and 266, the arms 276 and 278 drop into vertical slots 280 and 282 provided in upward extensions respectively on the lefthand arm of the normal opening handle 253 and the right-hand arm of the emergency opening handle 252. Thus a key 262 on the follower 260 is positioned in the keyway of the emergency handle boss 258, the arm 276 is positioned in the slot 280 to hold the normal opening handle in a fixed position. Thus the normal opening handle 253 is held in a fixed position so that it cannot rotate while the emergency opening handle 252 is free to rotate. As the latter is rotated, the boss 258 drives the splined follower 260 so as to rotate the shaft 254 and unlock and open the door, leaving the container attached to the floor and prepared for deployment in the manner described in connection with the first embodiment.

The bell crank 268 is actuated by a link 286 coupled between an upper arm of the bell crank 268 and an arm 288 affixed to the arming handle shaft 80'. As the arming handle 78' is pulled upwardly to its armed position, the shaft 80' is rotated, lifting link 286 to rotate the bell crank 268 in a clockwise directin to the position shown in FIG. 25, as the bell crank is rotated, the splined follower 260 is shifted so that the opposite key 264 of follower 260 engages the keyway in the normal handle boss 266, arm 276 is disengaged from the slot 280 in the normal opening handle, and the arm 278 is engaged with the slot 282 on the emergency opening handle 252. Thus in the unarmed mode, the emergency opening handle 252 cannot be moved while the normal opening handle 253 will rotate the shaft 254 through the follower 260 to shift link 56' to unlock the door and cause an upward traverse of the door with the slide container attached to the door.

The foregoing alternate embodiment has the advantage of providing a separate handle for opening the door under emergency conditions to deploy the safety slide. The separate handle is preferably labeled with the legend "Emergency Opening Handle" or some other legend so that it will not be inadvertently manipulated to open the door without first disarming the escape slide deployment mechanism under normal operating conditions. Otherwise, the actuating mechanism operates in substantially the same manner as that previously described.

The present invention has been described in relation to a preferred embodiment and an alternate embodiment for the actuating mechanism. One of ordinary skill, after reading the foregoing specification, will be able to effect various alterations, substitutions of equivalents, and other changes to the invention without departing from the broad concepts disclosed herein. For example, one of ordinary skill will understand that the deployment linkage arrangement as disclosed will still function to deploy the container even though the passenger deck floor is not horizontally oriented. The linkage is so contructed in the preferred embodiment to move the center of gravity of the container outboard of a vertical line through the pin 200 even when the floor is tilted (that is, slopes downwardly from the door opening) at an angle at least 12° to 15°. As another example, the upper latch member 172 can be modified to allow replacement or removal of the container from the door when the door is closed, rather than raising the door as is necessary with the disclosed embodimentModification of the latch member to permit easier removal of the container would require that the U-shaped member to rotatable to allow outward movement of the pack with means for preventing rotation of the member under normal conditions. It is therefore intended that the scope of protection granted by Letters Patent hereon be limited only by the definition contained in the appended claims and equivalents thereof.

What is claimed is:

1. In combination with a door and means mounting said door for upward and downward movement relative to a substantially horizontally oriented floor and into and out of engagement with a door opening in a wall associated with said floor, said movement being between a closed position adjacent said floor and in engagement with said door opening and an open position spaced upwardly from said floor and said door opening, said door having inner and outer sides, an improved apparatus for deploying an escape slide container normally attached to said door, said container having a center of gravity, comprising:

a movable member and support means operatively associated with said floor adjacent the bottom of said door opening, said support means being constructed to allow upward movement of said movable member relative to said floor, latch means operatively associated with said movable member, said latch means and said door having a first latching condition for securing said movable member to said door and releasing said movable member from said support means and a second latching condition for securing said movable member to said support means and for releasing said movable member from said door, linkage means for coupling said container to said movable member, said linkage means and said movable member being so constructed and associated with each other to mount said container for outward swinging movement relative to said door opening, said linkage means being so constructed as to hold said container in a stable position wherein said container will remain in a position located above said movable member, said linkage means capable of moving said container to an unstable position wherein the center of gravity of said container is shifted to a location so as to cause said container initially to swing outwardly toward said door opening solely under the urging of gravity, trip means associated with said linkage means for locking said linkage means to hold container in said stable position, and for causing said linkage means to move so as to shift said container to said unstable position in reaction to upward movement of said door when said latch means is in said second latching condition, thereby allowing said container to swing outwardly under the urging of gravity to position said container adjacent said door opening in readiness for deployment of an escape slide held by said container.

2. In combination with a door and means mounting said door for upward and downward movement relative to a substantially horizontally oriented floor and into and out of engagement with a door opening in a wall associated with said floor, said movement being between a closed position adjacent said floor and in engagement with said door opening and an open position spaced upwardly from said floor and said door opening, said door having inner and outer sides, an improved apparatus for deploying an escape slide container normally attached to said door, said container having a center of gravity, comprising:

a bar and support means operatively associated with said floor adjacent the bottom of said door opening, said support means being constructed to allow upward movement of said bar relative to said floor, said support means including a bearing means for mounting said bar for rotational movement between first and second positions, latch means operatively associated with said bar, said latch means and said bar having a first latching condition for securing said bar to said door and releasing said bar from said support means and having a second latching condition for securing said bar to said support means and for releasing said bar from said door, said latch means being in said first latching condition when said bar is in first position and being shifted to said second latching condition in reaction to rotation of said bar to said second position, said latch means including a rotatable member mounted for rotation in said bearing means, said rotatable member having a slot therein, said bar having a portion adapted to engage said slot, said slot being rotatable between an upwardly oriented position wherein said bar is released for upward movement relative to said floor and a locked position oriented transversely to said upwardly oriented position wherein said bar is prevented from moving upwardly and is thereby secured to said bearing means, linkage means for coupling said container to said bar, said linkage means and said bar being so constructed and associated with each other to mount said container for outward swinging movement relative to said door opening, said linkage means being so constructed as to hold container in a stable position wherein said container will remain in a position located above said bar, said linkage means capable of moving said container to an unstable position wherein the center of gravity of said container is shifted to a location so as to cause said container to swing outwardly toward said door opening under the urging of gravity, trip means associated with said linkage means for locking said linkage means to hold said container in said stable position and for causing said linkage means to move so as to shift said container to said unstable position in reaction to upward movement of said door when said latch means is in said second latching condition, thereby allowing said container to swing outwardly under the urging of gravity to position said container adjacent said door opening in readiness for deployment of an escape slide held by said container.

3. In combination with a door and means mounting said door for upward and downward movement relative to a substantially horizontally oriented floor and into and out of engagement with a door opening in a wall associated with said floor, said movement being between a closed position adjacent said floor and in engagement with said door opening and an open position spaced upwardly from said floor and said door opening, said door having an outer sides, an improved apparatus for deploying an escape slide container normally attached to said door, said container having a center of gravity, comprising:

a movable member and support means operatively associated with said floor adjacent the bottom of said door opening, said support means being constructed to allow upward movement of said movable member relative to said floor, latch means operatively associated with said movable member, said latch means and said door having a first condition for securing said movable member to said door and releasing said movable member from said support means and a second latching condition for securing said movable member to said support means and for releasing said movable member from said door, linkage means for coupling said container to said movable member, said linkage means and said movable member being so constructed and associated with each other to mount said container for outward swinging movement relative to said door opening, said linkage means being so constructed as to hold said container in a stable position wherein said container will remain in a position located above said movable member, said linkage means capable of moving said container to an unstable position wherein the center of gravity of said container is shifted to a location so as to cause said container to swing outwardly toward said door opening under the urging of gravity, said linkage means including a first link having one end thereof coupled to said movable member at a first coupling location for swinging movement outwardly toward said door opening, said container being coupled to the other end of said first link at a second coupling location for swinging movement outwardly toward said door opening, said container extending upwardly from said first link and from said floor, and a second link having one end thereof coupled to said first link at a third coupling location for swinging movement toward and away from said door opening, said container being coupled to the other end of said second link at a forth coupling location for swinging movement outwardly toward said door opening, said first and second links being so constructed and arranged and so coupled to each other as to have a first stable position in which said center of gravity is so located relative to said links as to position said container in said stable position inwardly relative to said door opening, trip means associated with said linkage means for locking said linkage means to hold container in said stable position, said trip means cooperating with said first and second links to hold said links in said first stable position thereby preventing said container from moving outwardly, said trip means causing said linkage means to move so as to shift said container to said unstable position in reaction to upward movement of said door when said latch means is in said second latching condition, said trip means cooperating with said first and second links to move said center of gravity outwardly toward said door opening thereby positioning said links in a second unstable position so as to move said container to said unstable position and to cause said container to fall outwardly toward said door opening about said coupling locations of said links to each other and to said movable member under the urging of gravity.

4. The apparatus of claim 3 wherein said movable member comprises a bar, said support means comprising a bearing means for mounting said bar for rotational movement between first and second positions, said latch means being in said first latching condition when said bar is in said first position and being shifted to said second latching condition in reaction to rotation of said bar to said position, and wherein further said first link comprises a first portion and a second portion, said first portion being rotatably mounted on said bar for outward swinging movement toward said door opening, said seond portion being releasably attached to said first portion, said apparatus further comprising coupling means for releasably coupling the first and second portions of said first link, said coupling means releasing said first and second portions in reaction to outward movement of said center of gravity about said first and second links.

5. The apparatus of claim 4 wherein said first and second links are so constructed as to position said container in said door opening as it swings outwardly toward said opening, and wherein said coupling means holds said first and second portions of said first link together until said container is positioned in said door opening.

6. The apparatus of claim 4 wherein said coupling means releases said first and second portions of said first link in reaction to swinging movement of the first portion of said first link about said bar.

7. The apparatus of claim 6 wherein said coupling means comprises:
a cam associated with said bar and a follower associated with said first and second portions of said first link, said cam being so constructed and arranged as to maintain said first and second portions of said first link in coupled relationship when said first link is in said first stable position, said cam being so shaped to allow said follower to release said first and second portions of said first link as said first link swings outwardly toward said door opening under the urging of gravity on said container.

8. The apparatus of claim 3 wherein said other end of said first link is coupled to said container for sliding movement relative thereto, said trip means being so associated with said first and second links when in said first stable position as to restrain movement of said other end of said first link relative to said container and to position said center of gravity of said container inwardly relative to said door opening from a vertical line through the other end of said second link.

9. The apparatus of claim 8 wherein said first link and said container are coupled by a cam follower and a mating cam surface, one of said first link and said container including said cam surface, the other of said first link and said container including said cam follower, said cam surface and said cam follower being arranged to permit movement of said cam follower relative to said cam surface along a predetermined path, said perdetermined path first permitting said center of gravity to move forwardly and downwardly to a position forward to said vertical line through said other end of said second link as said links are moved from said first stable position to said second unstable position, and thereafter to permit said center of gravity to swing downwardly and outwardly about said other end of said first link.

10. The apparatus of claim 9 wherein the first end of said second link is pivotally coupled to said first link and the other end of said second link is pivotally coupled to said container.

11. The apparatus of claim 3 wherein said trip means comprises a trip link pivotally mounted on said first link, said second link having a cam surface thereon, said trip link having a cam follower thereon spaced from the pivotal connection of said trip link to said first link, said cam surface being so constructed and arranged as to include a detent means for holding said trip link in a first position in which said first and second links are locked so as to hold said container in said stable position, said cam surface further being so constructed and arranged as to permit movement of said trip link to a second position, said cam follower cooperating with said cam surface as said trip link moves to said second position so as to allow the other end of said second link to move relatively away from the other end of said first link to thereby move the center of gravity of said container forwardly from a vertical line through the other end of said second link and position said container in said unstable position.

12. The apparatus of claim 11 wherein the detent means on said cam surface releasably holds said trip link in said first position, said trip link including an arm extending outwardly relative to said door opening past said first link, said door including a trip member for engaging said trip link and moving said trip link from the first position of said trip link and toward the second position of said trip link as said door moves upwardly when said latch means is in said second latching condition.

13. The apparatus of claim 4 wherein said bar comprises a girt bar, said apparatus further comprising means for flexibly coupling the second portion of said first link to said girt bar.

14. The apparatus of claim 13 wherein said means for flexibly coupling comprises a flexible strap interconnecting said second portion of said first link and said girt bar.

15. An overcenter linkage for use in securing an upright movable member in a first, stable position and for shifting the center of gravity of said movable member so as to cause said movable member to rotate about a base member comprising:

a first upwardly extending link swingably mounted on said base member, said link having an upper end adapted for connection to said movable member, a second link having an upper end and a lower end, the lower end of said second link being adapted for connection to said first link and the upper end of said second link being adapted for connection to said movable member, first coupling means for coupling the upper end of said first link to said movable member, second coupling means for coupling the upper end of said second link to said movable member, and third coupling means for coupling the lower end of said second link to said first link, said first link and said movable member, said second link and said movable member, and said first link and said second link being coupled members respectively coupled by said first, second and third coupling means, two of said first, second and third coupling means being means for pivotally coupling the respectively coupled members to each other, the remaining one of said first, second and third coupling means being a cam mechanism including a cam and a cam follower associated with the members respectively coupled by said remaining one of said first, second and third means, said cam mechanism being so constructed and arranged as to permit said movable member to tilt forwardly as the upper end of said first and second links are moved apart, and trip means for holding said first and second links in a first position wherein said movable member is held in said stable position, and for moving said first and second links to a second position wherein the upper ends thereof are spaced further apart than in said first position, thereby causing said movable member to tilt forwardly and to shift its center of gravity so as to cause it to rotate about said base member.

16. The apparatus of claim 15 wherein said second and third coupling means are means for pivotally coupling the respectively coupled members and said first coupling means is said cam mechanism.

17. In combination with a door and means mounting said door for upward and downward movement relative to a substantially horizontally horizontally oriented floor and into and out of engagement with a door opening in a wall associated with said floor, said movement being between a closed position adjacent said floor and in engagement with said door opening and an open position spaced upwardly from said floor and said door opening, said door having inner and outer sides, an improved apparatus for deploying an escape slide container normally attached to said door, said container having a center of gravity, comprising:

a movable member and support means operatively associated with said floor adjacent the bottom of said door opening, said support means being constructed to allow upward movement of said movable member relative to said floor, latch means operatively associated with said movable member, said latch means and said door having a first latching condition for securing said movable member to said door and releasing said movable member from said support means, and having a second latching condition for securing said movable member to said support means and for releasing said movable member from said door, said latch means including a hook member and means mounting said hook member on said movable member, said door having a latch pin thereon adapted to be engaged by said hook member when said movable member is in a first position, said means mounting said hook member being capable of moving said hook member to a position disengaged from said latch pin in reaction to movement of said movable member to a second position, linkage means for coupling said container to said movable means, said linkage means and said movable member being so constructed and associated with each other to mount said container for outward swinging movement relative to said door opening, said linkage means being so constructed as to hold said container in a stable position wherein said container will remain in a position located above said movable member, said linkage means capable of moving said container to an unstable position wherein the center of gravity of said container is shifted to a location so as to cause said container to swing outwardly toward said door opening under the urging of gravity, trip means associated with said linkage means for locking said linkage means to hold said container in said stable position and for causing said linkage means to move so as to shift said container to said unstable position in reaction to upward movement of said door when said latch means is in said second latching condition, thereby allowing said container to swing outwardly under the urging of gravity to position said container adjacent said door opening in readiness for deployment of an escape slide held by said container.

\* \* \* \* \*

UNITED STATES PATENT AND TRADEMARK OFFICE
CERTIFICATE OF CORRECTION

PATENT NO. : 4,106,729
DATED : August 15, 1978
INVENTOR(S) : Burton Bergman et al.

It is certified that error appears in the above-identified patent and that said Letters Patent are hereby corrected as shown below:

Column 17, line 26: —said— is inserted before "container".

Column 17, line 62: —said— is inserted before "first", second occurrence.

Column 18, line 40: "an" is deleted and —inner and— is inserted therefor.

Column 18, line 51: —latching— is inserted after "first".

Column 19, line 15: "forth" is deleted and —fourth— is inserted therefor.

Column 19, line 26: —said— is inserted after "hold".

Column 20, line 36: "to" is deleted and —of— is inserted therefor.

Signed and Sealed this

Fifteenth Day of May 1979

[SEAL]

Attest:

RUTH C. MASON
Attesting Officer

DONALD W. BANNER
Commissioner of Patents and Trademarks